United States Patent
Katirai et al.

(10) Patent No.: US 12,412,484 B1
(45) Date of Patent: Sep. 9, 2025

(54) COMPUTER SYSTEM AND METHOD FOR AUTOMATED EXAMINATION QUESTION GENERATION

(71) Applicant: PharmAchieve Corporation Ltd., Toronto (CA)

(72) Inventors: Hooman Katirai, Toronto (CA); Rashika Ramdev, Toronto (CA); Si Chao Chen, Toronto (CA); Naissan Vahman, Toronto (CA)

(73) Assignee: PharmAchieve Corporation Ltd., Toronto (CA)

( * ) Notice: Subject to any disclaimer, the term of this patent is extended or adjusted under 35 U.S.C. 154(b) by 0 days.

(21) Appl. No.: 18/941,816

(22) Filed: Nov. 8, 2024

(51) Int. Cl.
*G09B 7/06* (2006.01)

(52) U.S. Cl.
CPC ..................... *G09B 7/06* (2013.01)

(58) Field of Classification Search
None
See application file for complete search history.

(56) References Cited

U.S. PATENT DOCUMENTS

| | | | |
|---|---|---|---|
| 2022/0129629 A1 | 4/2022 | Niu et al. | |
| 2022/0414317 A1 | 12/2022 | Heyns | |
| 2024/0046392 A1* | 2/2024 | Tudela | H04L 67/535 |
| 2024/0394481 A1* | 11/2024 | Edwards | G06N 20/00 |

FOREIGN PATENT DOCUMENTS

| | | |
|---|---|---|
| AU | 20211101011 A4 | 4/2021 |
| CN | 113011154 A | 6/2021 |
| CN | 116975241 A | 10/2023 |
| CN | 117493513 A | 2/2024 |
| CN | 117573812 A | 2/2024 |
| CN | 117688161 A | 3/2024 |
| CN | 117891902 A | 4/2024 |
| CN | 117954087 A | 4/2024 |
| CN | 118014083 A | 5/2024 |
| CN | 118053332 A | 5/2024 |
| CN | 118053590 A | 5/2024 |

(Continued)

OTHER PUBLICATIONS

Arabi et al. ("Improving plagiarism detection in text document using hybrid weighted similarity"), (Year: 2022).

(Continued)

*Primary Examiner* — James B Hull

(57) ABSTRACT

Methods, devices, and processor-readable media for automated generation of examination questions. A first large language model (LLM) prompt is generated by inserting a first set of one or more parameters into a first LLM prompt template, the first LLM prompt including instructions to provide a second set of one or more parameters pertaining to a question scenario. A first prompt response for the first LLM prompt includes the second set of one or more parameters. A second LLM prompt is generated by inserting the second set of one or more parameters into a second LLM prompt template, the second LLM prompt including instructions to provide structured question unit content based on the second set of one or more parameters. A second prompt response is received for the second LLM prompt, the second prompt response including the structured question unit content.

18 Claims, 13 Drawing Sheets

(56) References Cited

FOREIGN PATENT DOCUMENTS

| | | |
|---|---|---|
| CN | 118098562 A | 5/2024 |
| CN | 118152533 A | 6/2024 |
| CN | 118170892 A | 6/2024 |
| IN | 202341043393 A | 9/2023 |

OTHER PUBLICATIONS

Hassanipour S, Nayak S, Bozorgi A, Keivanlou M, Dave T, Alotaibi A, Joukar F, Mellatdoust P, Bakhshi A, Kuriyakose D, Polisetty L Chimpiri M, Amini-Salehi E "Ability of ChatGPT in Paraphrasing Texts and Reducing Plagiarism: A Descriptive Analysis" JMIR Med Educ 2024, (Year: 2024).

Chan, W. et al., "A Case Study on ChatGPT Question Generation", 2023 IEEE International Conference on Big Data, Dec. 15-18, 2023 (Dec. 18, 2023).

Hadzhikoleva, S. et al., "Automated Test Creation Using Large Language Models: A Practical Application", Applied Sciences, vol. 14, No. 19, Oct. 9, 2024 (Oct. 9, 2024). [Retrieved from the Internet on Jun. 10, 2025 (Jun. 10, 2025) at URL: https://www.mdpi.com/2076-3417/14/19/9125].

Li, C. et al., "Learning to Rewrite Prompts for Personalized Text Generation" Proceedings of the ACM Web Conference 2024 (WWW '24), Singapore, Singapore, May 13-17, 2024 (May 17, 2024). [Retrieved from the Internet on Jun. 11, 2025 (Jun. 10, 2025) at URL: https://dLacm.org/doi/pdf/10.1145/3589334.3645408].

Pawar, P. et al., "Automated Generation and Evaluation of MultipleChoice Quizzes using Langchain and Gemini LLM", 2024 International Conference on Electrical Electronics and Computing Technologies (ICEECT), IEEE, Greater Noida, India, Aug. 29-31, 2024 (Aug. 31, 2024).

\* cited by examiner

304

Select System:
Cardiovascular 306 ⌄

Select Concern:
Angina 308 ⌄

Select L2 Area: ⎫
☐ Management of Care
☐ Safety and Infection Control
☒ Health Promotion and Maintenance
☐ Psychosocial Integrity
☒ Basic Care and Comfort
☐ Pharmacological and Parenteral Therapies
☐ Reduction of Risk Potential
☐ Physiological Adaptation ⎭ 310

Select Number (N):
4  312  ⌄

Submit

Select Question type:
☒ Multiple Choice
☐ Select All That Apply
☒ Select N Multiple Response
. . .

Submit

FIG. 3A

Section Questions

| ID | System | Concern | L2 | Keywords | Status | Actions |
|---|---|---|---|---|---|---|
| PS1 | | | | 314 | | |
| 87 | Cardiovascular | Angina | Management of Care, Safety and Infection Control | L3: Confidentiality/Information Security<br>L4: Assess staff member and client understanding of confidentiality requirements<br>Setting: Hospital<br>Age group: Adult<br>Question topic: Assessing client understanding of confidentiality<br>Disease or condition: Unstable Angina | Not Selected | Use |
| PS2 | | | | | | |
| 88 | Cardiovascular | Angina | Management of Care, Safety and Infection Control | L3: Ergonomic Principles<br>L4: Use ergonomic principles when providing care<br>Setting: Homecare<br>Age group: Geriatric<br>Question topic: Use of ergonomic principles to prevent injury<br>Disease or condition: Microvascular Angina | Not Selected | Use |
| PS3 | | | | | | |
| 89 | Cardiovascular | Angina | Management of Care, Safety and Infection Control | L3: Safe Use of Equipment<br>L4: Teach client about safe use of equipment needed for health care<br>Setting: Hospital<br>Age group: Pediatric<br>Question topic: Educating on safe use of equipment<br>Disease or condition: Variant Angina | Not Selected | Use |
| PS4 | | | | | | |
| 90 | Cardiovascular | Angina | Management of Care, Safety and Infection Control | L3: Standard Precautions/Transmission-Based Precautions/Surgical Asepsis<br>L4: Apply principles of infection prevention<br>Setting: Hospital<br>Age group: Adult<br>Question topic: Implementing measures for infection control<br>Disease or condition: Stable Angina | Not Selected | Use |

Add More

FIG. 3C

| System | Disease or Procedure Choice | Disease or Procedure | Complication | Keywords |
|---|---|---|---|---|
| PCD1 Cardiovascular | Disease | Hypertension | N/A | Setting: Pediatric Unit<br>Age group: Pediatric<br>Scenario Description: A 10-year-old child is brought to the pediatric unit with complaints of frequent headaches and fatigue. Upon examination, the child's blood pressure is recorded at 128/82 mmHg, which is unusually high for their age. |
| PCD2 Cardiovascular | Disease | Hypertension | N/A | Setting: Community Clinic<br>Age group: Geriatric<br>Scenario Description: An 82-year-old female visits the community clinic for a routine check-up. During the visit, she mentions feeling more tired than usual and having occasional dizzy spells. Her blood pressure is measured at 165/100 mmHg. |
| PCD3 Cardiovascular | Disease | Hypertension | N/A | Setting: Cardiovascular Unit<br>Age group: Adult<br>Scenario Description: A patient presents to the cardiovascular unit with chest pain and shortness of breath. They report a history of uncontrolled hypertension. Blood pressure on admission is 180/110 mmHg. |
| PCD4 Cardiovascular | Disease | Hypertension | N/A | Setting: Homecare<br>Age group: Geriatric<br>Scenario Description: A 76-year-old male receiving homecare services is monitored for hypertension management. Recently, he has shown signs of confusion and restlessness, with his blood pressure readings fluctuating between 150/90 mmHg and 190/110 mmHg. |

510

Next

FIG. 5B

COMPUTER SYSTEM AND METHOD FOR AUTOMATED EXAMINATION QUESTION GENERATION

RELATED APPLICATION DATA

This is the first-filed application for this disclosure.

FIELD

The present application generally relates to the use of computer systems for automated generation of examination questions, and more particularly to improvements in an efficiency and a performance of an automated system for generating examination questions.

BACKGROUND

The use of computer systems, and in particular computer systems that are enabled with large language models (LLMs) to automate the generation of examination questions has been receiving extensive attention. LLMs like GPT-4™ can be used to generate exam questions. They can create questions across various subjects, difficulty levels, and formats, including multiple-choice, short answer, and essay-style questions.

However, the use of LLM-enabled computer systems to generate exam questions can come with several potential challenges and problems, including:

(1) Overfitting to Specific Patterns: If used extensively, LLM-generated questions may follow predictable patterns or formats, making it easier for students to guess the answers without fully understanding the material. Further, an LLM might generate similar or repetitive questions, reducing the diversity of the exam content.

(2) Accuracy and Fact-Checking: LLMs might generate questions with incorrect information, especially in specialized or niche subjects. This could lead to confusion or misinformation if the questions are not thoroughly vetted.

(3) Ambiguity: Some questions may be ambiguous or poorly phrased, leading to multiple interpretations that could confuse students.

(4) Relevance and Alignment with Examination Objectives: The generated questions might not align perfectly with the specific requirements and constraints of an examination, resulting in questions that are do not meet the examination requirements.

(5) Lack of Depth: LLMs may produce questions that lack the necessary depth or fail to cover critical aspects of the topic, particularly in higher-level education where nuanced understanding is required.

(6) Difficulty in Creating Higher-Order Thinking Questions: LLMs are more adept at generating factual or recall-based questions, but they might struggle to create questions that assess higher-order thinking skills, such as analysis, synthesis, and evaluation. Crafting questions that accurately test complex reasoning or problem-solving skills can be challenging for LLMs, leading to oversimplified or insufficiently challenging questions.

(7) Context Errors: LLMs might generate questions that do not fit well within the context of the exam or the preceding content, leading to confusion or a lack of coherence or lack of adherence to standardized norms in the assessment. In addition, the LLM's generated questions may not adhere to standardized norms, formatting and constraints of standardized exams making them less suitable or unsuitable for use in standardized exams while also resulting in unrealistic questions when used for preparation for such standardized exams.

(8) Loss of Pedagogical Intent: The subtle nuances that an exam drafter might include in hand-crafted questions, which are designed to probe specific areas of understanding, may be lost when using an LLM.

To mitigate these issues, it's crucial to have a rigorous review process in place where educators carefully vet and refine LLM-generated questions. Combining the strengths of LLMs with human expertise can help create well-rounded, accurate, and effective exams.

LLM-enabled computing systems can require extensive computing resources that consume high amounts of power. Inefficient and ineffective use of these computing systems to generate non-ideal or repetitive examination questions inherently results in inefficient use of computing resources and power. Accordingly, there is a need for improving the efficiency and performance of automated systems for generating examination questions.

SUMMARY

According to one example aspect, a computer-implemented method is disclosed for automated generation of examination questions. The method includes: generating, by one or more processors, a first large language model (LLM) prompt, including inserting a first set of one or more parameters into a first LLM prompt template, the first LLM prompt including instructions to provide a second set of one or more parameters pertaining to a question scenario based on the first set of one or more parameters; receiving, by the one or more processors, a first prompt response for the first LLM prompt, the first prompt response including the second set of one or more parameters pertaining to the question scenario; generating, by the one or more processors, a second LLM prompt, including inserting the second set of one or more parameters pertaining to the question scenario into a second LLM prompt template, the second LLM prompt including instructions to provide structured Question Unit content based on the second set of one or more parameters; receiving, by the one or more processors, a second prompt response for the second LLM prompt, the second prompt response including the structured Question Unit content; and preparing, by the one or more processors, a finalized question record in a specified computer readable format based on the structured Question Unit content and storing the finalized question record in a non-transitory memory.

According to a further example aspect, a computer implemented method is disclosed that comprises obtaining feedback, input via a user device, for structured question unit content. An LLM prompt is generated that includes instructions to regenerate some or all of the structured question unit content based on the feedback. A response is received for the LLM prompt, the response including regenerated structured question unit content. A finalized question record is prepared in a specified computer readable format based on the regenerated structured question unit content and storing the finalized question record in a non-transitory memory. In some examples, obtaining the feedback comprises receiving an indication of a deficiency in the question unit content, and the generated LLM prompt includes instructions to remedy the indicated deficiency. In some examples, the feedback includes an indication that a variant be generated in respect of the question unit content and the LLM prompt is generated to include instructions to regenerate some or all of the structured question unit content to provide the variant of the question unit content.

According to a further example aspect a computer implemented method is disclosed that includes, using one or more processors: obtaining structured question unit content corresponding to an examination question; generating an LLM prompt, including inserting at least some of the structured question unit content into an LLM prompt template, the LLM prompt including instructions for an LLM to review the at least some structured question unit content to ensure it meets a specified criteria and refine the at least some structured question unit content if required to meet the specified criteria; receiving a response for the LLM prompt, the response including any refinements made by the LLM in respect of the at least some structured question unit content; and preparing a finalized question record in a specified computer readable format based on the response and storing the finalized question record in a non-transitory memory.

According to a further example aspect, a computer implemented method is disclosed that include using one or more processors to: obtain structured question unit content corresponding to a first examination question, the structured question unit content including an introductory text and a question stem; a set of answer choices; and for each answer choice, an indication of whether the answer choice is correct or incorrect and an explanation of why the answer choice is correct or incorrect; generate an LLM prompt including instructions for an LLM to provide a further version of the first examination question; receive a response for the LLM prompt, the response including revised structured question unit content including changes to one or more of the introductory text, question stem and the set of answer choices; and prepare a finalized question record that includes a second version of the first examination question based on the revised structured question unit content and storing the finalized question record in a specified computer readable format in a non-transitory memory, wherein the finalized question record includes information that indicates that the second version of the first examination question is an alternative version of the first examination question.

According to a further example aspect, a system is disclosed that includes or more processors, and one or more memories storing machine-executable instructions thereon which, when executed by the one or more processors, cause the system to perform the method of any one of the preceding methods.

According to a further example aspect, a non-transitory processor-readable medium is disclosed having machine-executable instructions stored thereon which, when executed by one or more processors, cause the one or more processors to perform the method of any one of the preceding methods.

According to a further example aspect, computer program is disclosed that configures a computer system to perform the method of any one of the preceding methods.

According to a further example aspect, an apparatus is disclosed that is configured to perform the method of any one of the preceding methods.

BRIEF DESCRIPTION OF THE DRAWINGS

Reference will now be made, by way of example, to the accompanying drawings which show example embodiments of the present disclosure, and in which:

FIG. 3A illustrates an interactive user interface display for enabling a user to select question type categories.

FIG. 3B illustrates an interactive user interface display for enabling a user to select high level question scenarios.

FIG. 3C illustrates an interactive user interface display for enabling a user to select and edit question scenarios that have been proposed by an LLM.

FIG. 5B illustrates an interactive user interface display for enabling a user to select and edit patient case descriptions.

Similar reference numerals may have been used in different figures to denote similar components.

DESCRIPTION OF EXAMPLE EMBODIMENTS

Figure 1:
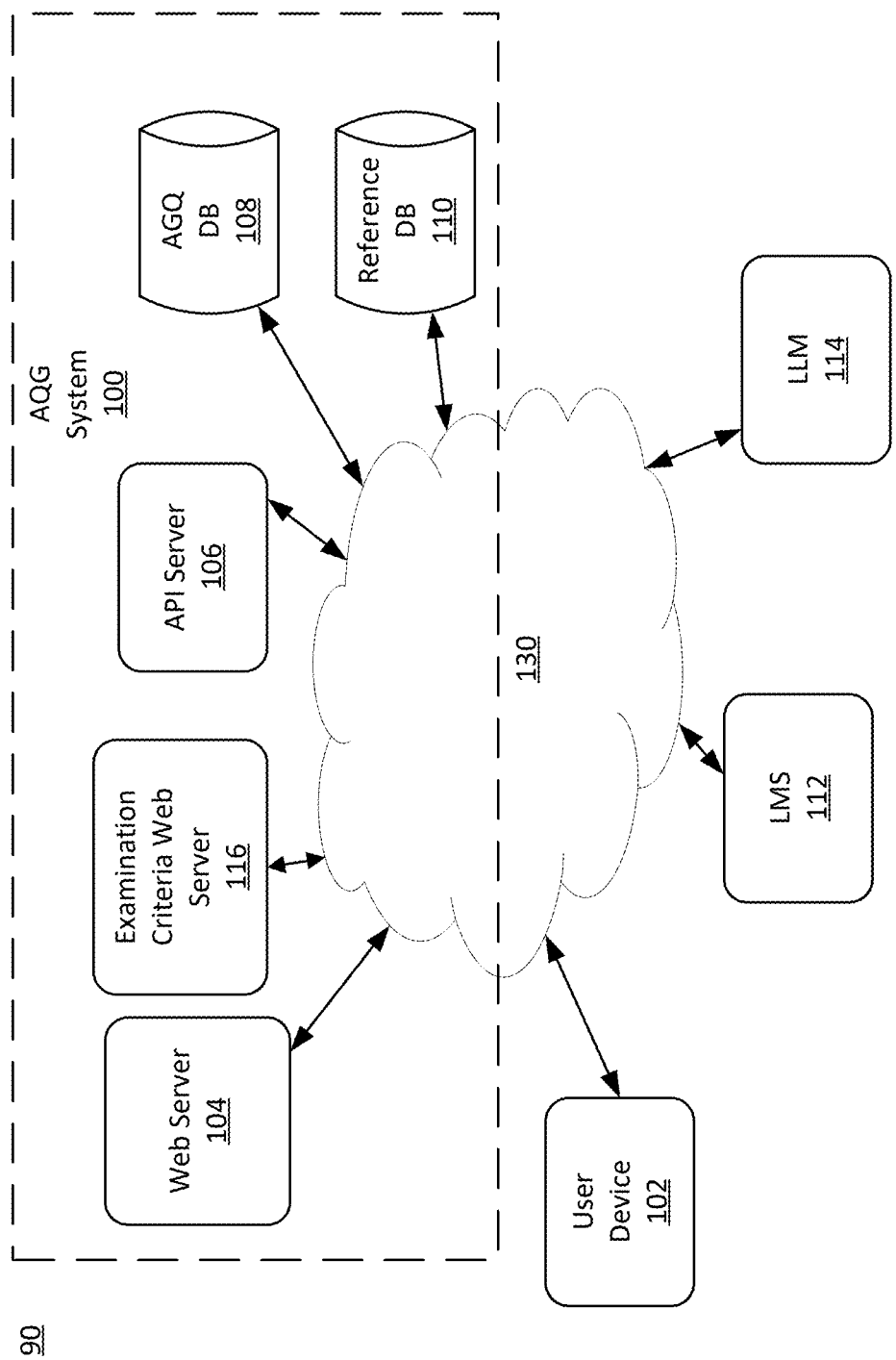
FIG. 1 is a block diagram showing an environment that includes an automated examination question generation system according to example embodiments.

Examples of an automated question generation (AQG) system (sometimes called an Automatic Item Generation (AIG) system) are described herein. The disclosed examples describe systems and methods that can improve the efficiency and operation of computer systems that are used for automated question generation. Among other things, the disclosed systems and methods can mitigate one or more of the issues identified above that are experienced by current LLM based question generation, namely overfitting, accuracy and fact-checking, ambiguity, relevance and alignment with examination objectives, lack of depth, difficulty in creating higher-order thinking questions, context errors, and loss of pedagogical intent. The disclosed systems and methods can thus provide an environment in which an LLM based system can be more effectively and efficiently employed to achieve an objective of generating effective and useful examination questions.

In some examples, the disclosed AQG system can be configured to support an on-line examination platform for examinations that are required for professional certification. By way of example the National Council of State Boards of Nursing, Inc. (NCSBN) administers the NCLEX® Registered Nurse Examinations, which is a computer-based registered nursing certification examination. Similarly, the organization CGFNS International® administers the CGFNS Qualifying Exam®, which is a computer-based registered nursing certification examination delivered through the Kryterion testing network. Although nursing certification examinations are used as an illustrative example in the present disclosure, the methods and systems disclosed herein can be applied to any type of professional certification examinations, as well as other types of examinations.

The following Legend identifies some abbreviations and terminology that are used throughout the description:

A—Age Group.

C—Complication of a disease, condition or procedure (e.g., Diabetic Ketoacidosis).

Case—A fact scenario that can serve as a basis for a set of Question Units Q.

CC—Cause of Complication.

CNRI—Cues not requiring intervention.

CN—Concern.

COMP—Complications of the DPC or C

Context—Text chunks from contextual sources (returned by Vector/keyword DB).

DPC—Disease, Procedure or Condition.

ECEC—Excerpt consistent with experiencing condition.

HLT—High Level Topic (e.g. Cardiovascular).

I—Intervention.

LREFS—A predefined list of references to choose from.

L2—Level 2.

L3—Level 3.

L4—Level 4.

N—Quantity of desired question scenarios.

NPT—Non-Pharmacological Treatment.

PC—Patient Case (a pre-specified quantity of Question Units Qs about a case).

PCD—Patient Case Description including SD, System, A, DPC, S and optionally C.

PT—Pharmacological Treatment.

Question—A set of text that includes introductory text (also known as an item stem) followed by a Question Stem.

Question Stem—The portion of a question that contains the actual question being asked.

Q—Question Unit—Structured data unit that can include a question, answer choices, an indication of whether each answer choice is correct or incorrect and explanation of why it is correct/incorrect), and optionally background information and references that support the question.

QT—Question Type—type of question to generate (e.g. multiple choice, fill-in-the-blank, etc.).

Refs—References (e.g. textbooks, journal articles, etc.) sometimes including a Uniform Resource Locator (URL).

RP—Relevant Passages from references that could be used to answer the question.

isAnswerable—A boolean (true/false) value indicating if the question can be answered from references.

WhyAnswerable—An explanation of why the question is answerable.

LREFS—List of pre-specified references to choose from.

Refs—References (e.g. textbooks, journal articles, etc.) sometimes including a Uniform Resource Locator (URL).

RR—Reference Range (range of values considered normal for a given lab value).

S—Setting (e.g. Long Term Care, Hospice, Hospital Cardiac Unit, etc.).

SD—Scenario Description—A short description of a patient case, usually one or two sentences.

SS—Signs and Symptoms.

Tags—Tags such as cognitive level, difficulty level, systems and corresponding concerns, concepts and sub-concepts, client needs areas.

T—Topic.

T_e—Topic after human review.

T_concepts_and_concerns—List of concept and concern tags.

Angled brackets—Indicates a vector, e.g. <A, B, C> is a vector of variables of type A, B, and C. Square brackets indicate a description of parameters and may include explicit lists of variable types e.g. [<A,B>,C] denotes a group of variables consisting of the vector variable <A,B> (which consists of a vector with variable types A and B) as well as a variable of variable type C. In figures and diagrams parentheses inside the content of square brackets is used to denote optional parameters; e.g. [A,(B)] means variable of type A and optional variable of type B.

FIG. 1 shows an example of an automated question generation (AQG) system 100 within an environment 90 that comprises a plurality of computer implemented components that are interconnected by a data communications network 130 according to example embodiments. Data communications network 130 can include one or more digital communications networks that communicate information between devices using defined protocols and formats, including for example, one or more of the Intranet, intranets, wired and wireless local area networks, cellular data networks, virtual private networks, and the like.

In example implementations, a computer implemented component refers to a combination of computer hardware and software. The software can be executed by the computer hardware to cause the computer implemented component to perform a set of functions and operations to accomplish one or more tasks.

The computer implemented components illustrated in FIG. 1 include components that interact with the AQG system 100 such as a user device 102, a Learning Management System (LMS) 112 and a Large Language Model (LLM) 114. Although only one instance of user device 102, LMS 112 and LLM 114 are shown in FIG. 1, the environment 90 can include several of such components. Furthermore, in some examples, one or more user devices 102, LMSs 112 and/or LLMs 114 could be integrated as components into the AQG system 100.

As will be described in greater detail below, the computer implemented components of the AQG system 100 are collectively configured to receive inputs from user device 102 and interface with LLM 114 to generate a set of examination questions that can then be used by LMS 112 to provide on-line exams. One or more computer components of the AQG system 100 and the LMS 112 include non-transitory memory for storing examination question content and records.

User device 102 can, for example, be a computer system such as a personal computer, a laptop, a mobile smart phone or the like that includes user input and output devices that enables an end-user to interact with the AQG system 100.

LMS 112 can, for example, be a system that is used to manage, deliver and measure training and learning online. By way of example, Moodle™ provides open-source software that can configure a server to operate as an LMS system. In an illustrated example, LMS 112 is configured to enable examinees to take on-line examinations. Although an LMS is used in the examples for the delivery of the questions, the questions generated by AQG system 100 can be delivered through other means such as a static web page accessible on a network, or via a survey software platform such as Survey Monkey™ which enables multiple choice, select all that apply and matrix multiple choice questions to be delivered to users on the Internet.

In the illustrated example, LLM 114 is configured to generate outputs in response to prompts. These outputs can include natural language examination questions. In at least some examples LLM 114 can include a commercially available LLM, for example an LLM such as provided by ChatGPT™, Claude™, or Llama™. In some examples, AQG system 100 may access multiple LLMs.

In the illustrated example, AQG system 100 includes a Web Server 104 that is configured to function as an interface between the user device 102 and the AQG system 100. Other components of the AQG system 100 include a AQG database (DB) 108, a reference database (DB) 110, an Application Programming Interface (API) Server 106, and an examination criteria DB Server 116.

API server 106 is configured to implement a set of rules and protocols that allow components of the AQG system 100 to communicate with each other and access Large Language Model (LLM) 114.

AQG DB 108 is configured to store data generated by the AQG system 100. Reference DB 110 is a vector and/or keyword and/or phrase indexed database that is used to stored context information that can be used by the AQG system 100 when generating questions and/or to confirm if questions generated by the system can be answered using the information in the references.

Although the AQG system 100 is shown as a distributed system, in alternative examples multiple components can be hosted on a common computer system. Furthermore, in some examples, the functionality of some of the components may be distributed across multiple computer systems.

In an example embodiment, access to AQG system 100 is provided under a Software-as-a-Service (SaaS) model by a SaaS provider that operates the AQG system 100. For example, an authorized end user registered with the AQG system 100 may access the AQG system 100 through a web browser present on user device 102 with the purpose of having the AQG system 100 interface with a LLM 114 to generate a set of examination questions that can then be used for an online examination. In some examples, user device 102 may be part of LMS 112, and the examination questions may be generated for a certification exam.

The functionality of each of the components of environment 90, including the components of AQG system 100, will now be described in greater detail below in the context of an automated question generation process for generating examination questions for a certification examination.

In the present example, AQG system 100 has been pre-configured to support question generation for a registered nurse (RN) certification examination that is administered by a certification organization. The examination questions that are generated must meet a set of predetermined examination criteria or rules (for example, criteria required for NCLEX® examinations) that are set by the relevant certification organization or examination authority. Although the present example is described in the context of RN examinations for illustrative purposes, the AQG system 100 can be configured to support examination question generation for any suitable type of testing or examination. In the illustrated example, some or all of the predetermined examination rules are accessible by the Web Server 104 via examination criteria database (DB) server 116.

Stand Alone Question Generation Implementation

A first example implementation of AQG system 100 will now be described with reference to FIGS. 2A, 2B, 2C, 2D, 2E, 3A, 3B and 3C. In this first example implementation, AQG system 100 is configured to interact with LLM 114 to generate a single, stand alone, question per generated scenario.

Figure 2A:
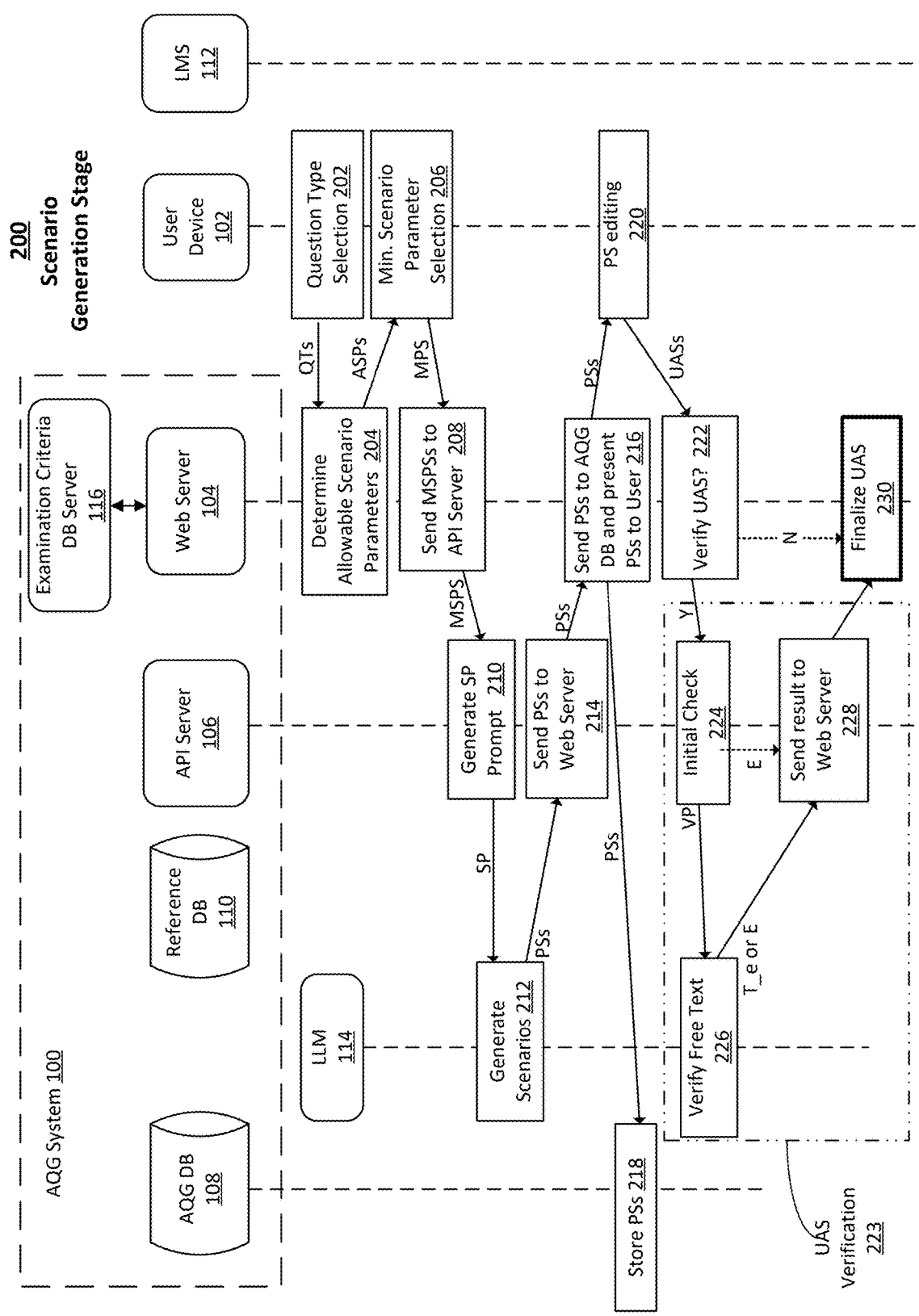
FIGS. 2A, 2B, 2C, 2D and 2E are block diagrams illustrating operations performed by, and signaling between, various components of the environment of FIG. 1, with FIG. 2A showing a Question Scenario Generation Stage, FIG. 2B showing a Question Generation Stage, FIG. 2C showing a Question Review and Enhancement Stage, FIG. 2D showing a Tagging and Answerability Stage, and FIG. 2E showing a final Question Review Stage.
Figure 2B:
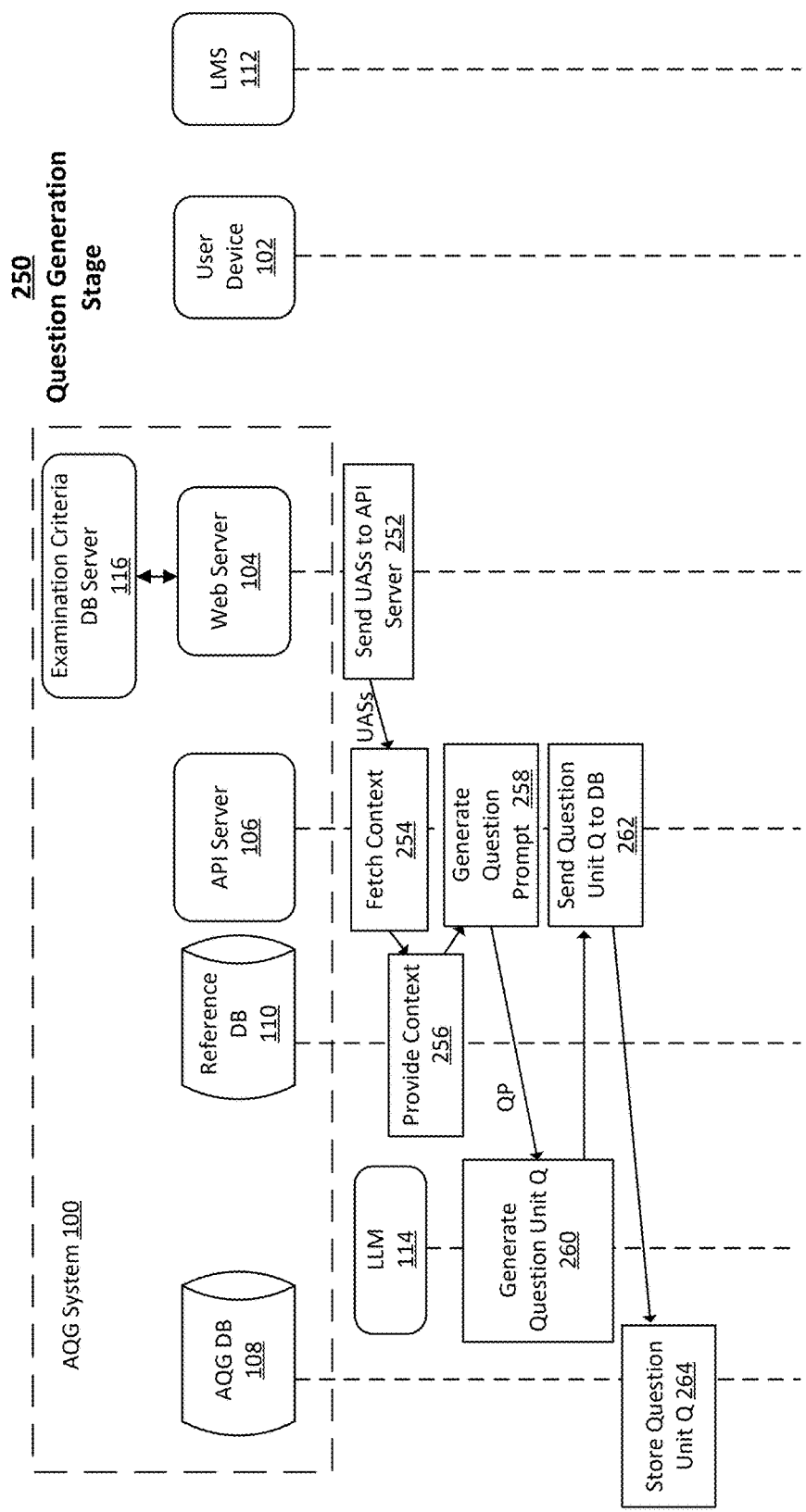
Figure 2C:
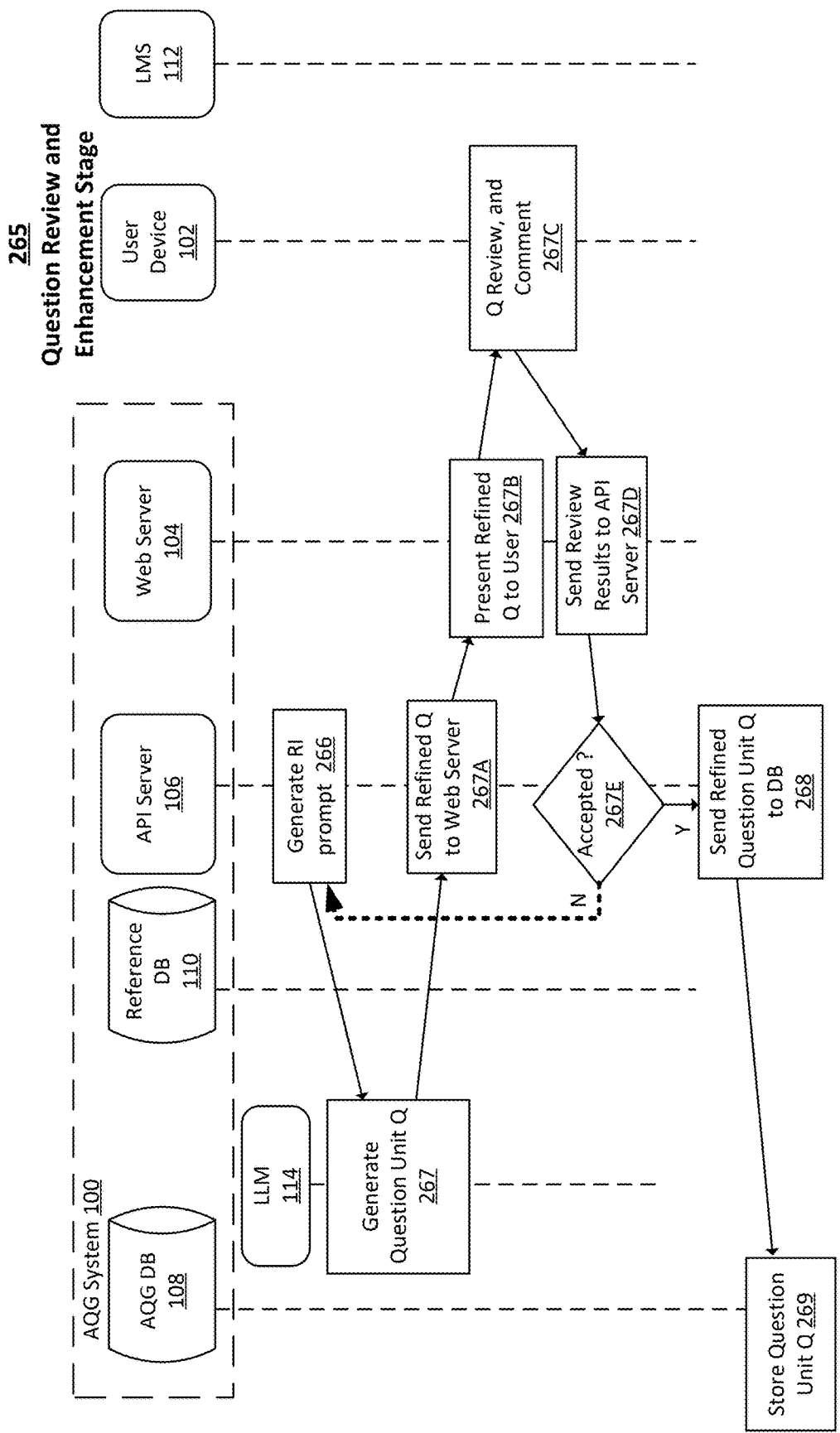
Figure 2D:
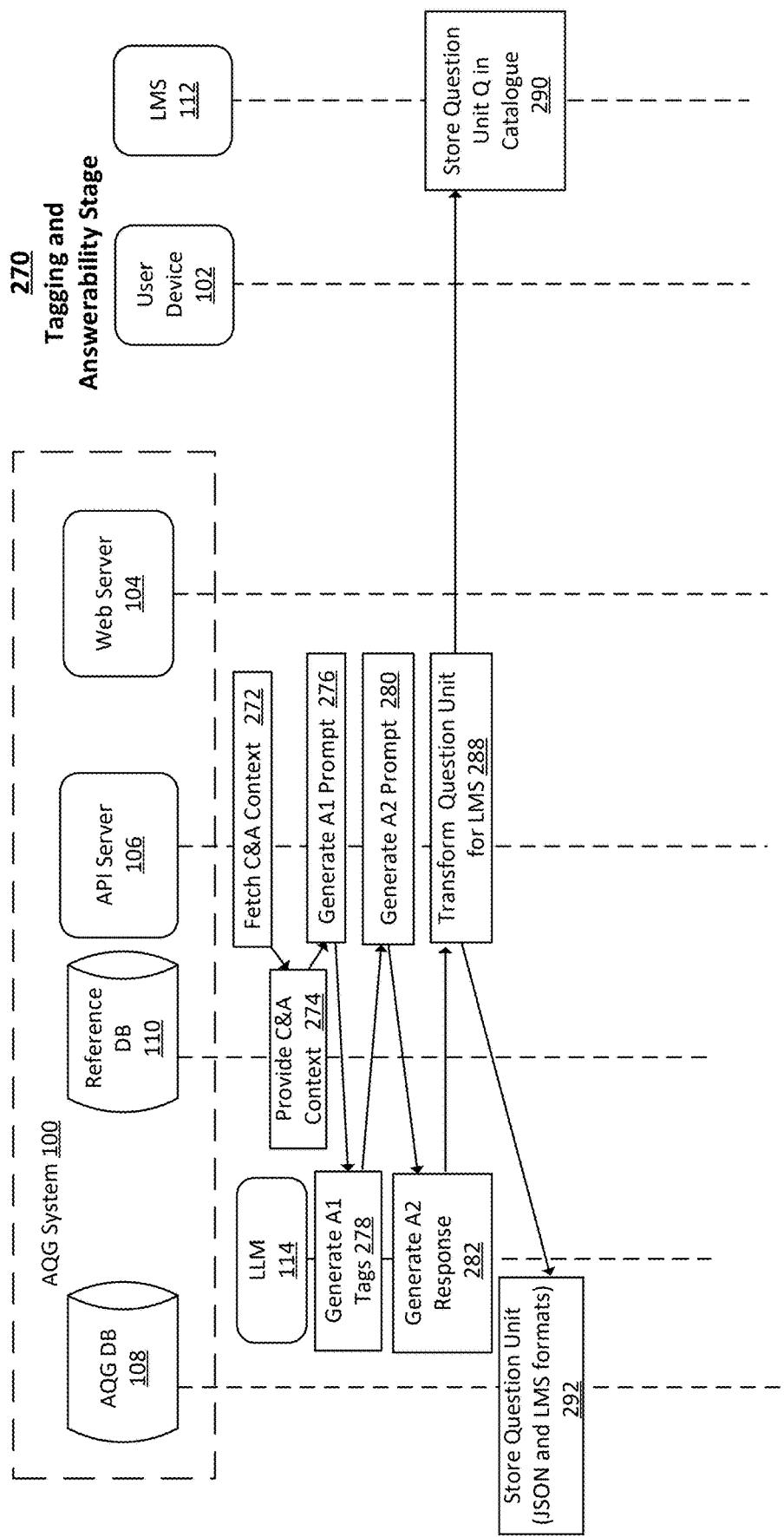
Figure 2E:
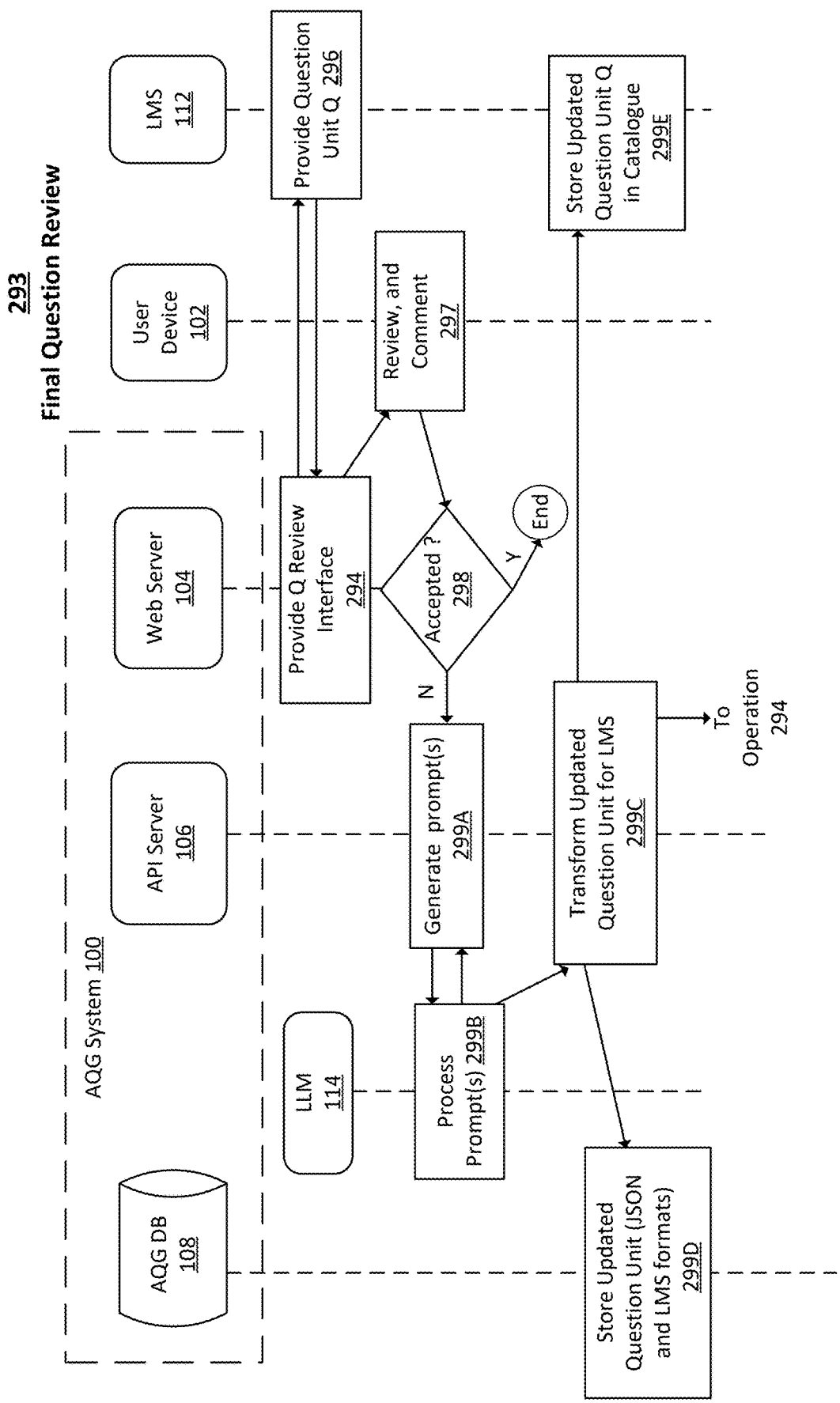

The generation of an examination question using AQG system 100 is described below in three stages with reference to flow diagrams FIGS. 2A, 2B, 2D, and 2E, which illustrate operations performed by, and signaling between, various components of environment 90. FIG. 2A shows a Scenario Generation Stage 200. FIG. 2B shows a Question Generation Stage 250. FIG. 2C shows a Question Review and Enhancement Stage 265. FIG. 2D shows a Tagging and Answerability Stage 270. FIG. 2E shows a Final Question Review stage 293.

Scenario Generation Stage 200 will now be described. In the illustrated example, a scenario can be defined by a set of natural-language scenario parameters. The purpose of the scenario parameters is to constrain the LLM 114 when it is prompted in question generation stage 250 stage to generate a Question Unit Q. The scenario parameters can be grouped into multiple categories, some of which can be hierarchical (a higher-level parameter category can include a plurality of lower-level parameter categories). Some parameter categories can have sub-categories and sub-sub-categories, and so-on. In example embodiments, the parameter categories and the values selectable within those categories are defined to conform to the set of predetermined examination criteria or rules (for example, criteria required for NCLEX® RN examinations in the presently described example).

In this regard, representative scenario parameter categories can include the following:

Scenario Type—Each Scenario is categorized with a "Scenario Type" from a defined list of scenario types. By way of example, in the context of RN examinations, the list of scenario types can include two options, namely: (i) System, and (ii) Concept.

Scenario Category—Each Scenario Type is associated with a defined list of Scenario Categories. For example: (i) for the Scenario Type "System", the Scenario Category can be selected from a predefined list of options that correspond to different System categories. These System categories can be derived from the predetermined examination criteria and in the case of RN examinations can, for example, include body systems (e.g., "Cardiovascular System", "Lymphatic System", "Respiratory System", etc.) and non-body systems (e.g., "Nursing skills and Fundamentals", "Pediatrics", "Community Health", "Mental Health", "Medical-surgical", "Maternity", "Women's Health", etc.). (ii) For the Scenario Type "Concept", the Scenario Category can be selected from a predefined list of concept-related options that correspond to different Concept categories derived from the predetermined examination criteria and can include, for example, "Care Coordination", "Clinical Judgement", Client Education", "Reproduction", etc.

Scenario Sub-Category—Each Scenario Category is associated with a defined list of scenario sub-categories. In the RN Examination example, Scenario Sub-Categories are referred to as concerns ("CNs"). By way of example, in the case of Scenario Type=System, and Scenario Category="Cardiovascular System", the list of Concerns (CNs) can include diseases (such as "Peripheral Artery Disease"), procedures such as ("PCI/bypass"), conditions (such as "Hypertension"), "diagnostics", "advocacy", "diet", "exercise", and "education", "health and physical assessment", "pharmacology", "surgical care" as well as cardiovascular system-related topics, such as, "ECG Basics" and "Arrhythmias".

In the illustrated implementations, each individual Scenario is classified as belonging to a particular Scenario Category and Scenario Sub-Category pair. For example, in the case of RN Examinations, the <Scenario Category, Scenario Sub-Category> are treated as a highest level parameter set, where <Scenario Category> is either a value selected from the list of Scenarios Categories that correspond to the Scenario Type=System or a value selected from the list of Scenarios Categories that correspond to the Scenario Type=Concept. The Scenario Sub-Category Scenario Sub-Topic value is selected from a respective list of Concerns (CN) that is predefined for each of the Scenario Categories. Throughout this disclosure, the vector pair <System, CN> is used to refer to a <Scenario Category, Scenario Sub-Category> pair where the Scenario Type=System, and the vector pair <Concept, CN> is used to refer to a <Scenario Category, Scenario Sub-Category> pair where the Scenario Type=Concept.

Each <Scenario Category, Scenario Sub-Category> pair (e.g., <System, CN> or <Concept, CN>) can be associated with respective hierarchical pre-defined groups of further sub-categories and sub-sub categories. By way of example, in the case of the RN examination example, these further sub-categories and sub-sub categories can be hierarchical groups of "Client Need areas" but the disclosed methods and system can be applied to any hierarchy associated with a professional examination such as hierarchies modelling the knowledge, skills, behaviors or competencies the could be tested in a professional examination. In the illustrated example, up to three hierarchical levels of "Client Need areas" categories can be defined for each <System, CN> or <Concept, CN> pair, as follows.

Level 2<L2>—denotes a highest category of Client Need Area. For example, possible topics that can be included as values in a predefined list of Client Need Area can include, but are not limited to: "Management of Care", "Safety and Infection Control", "Health Promotion and Maintenance", "Psychosocial Integrity", "Basic Care and Comfort", "Pharmacological and Parenteral Therapies", "Reduction of Risk Potential", and "Physiological Adaptation)".

Level 3<L3>—denotes a sub-category (e.g., a sub-area) of a respective L2 Client Need Area (e.g., "Behavioral Interventions").

Level 4<L4>—denotes a respective sub-category of the L3 sub-category of the L2 Client Need Area (e.g., "Assess client's appearance mood and psychomotor behavior and identify/respond to inappropriate/abnormal behavior").

Client Need Areas parameters can be grouped to provide Client Need areas parameter vectors of interdependent topic categories, for example: Client Need Area pair <L2, L3>— (e.g., <Psychosocial Integrity, Behavioral Interventions), and Client Need Area tuple <L2, L3, L4>—(e.g., <Psychosocial Integrity, Behavioral Interventions, Assess client's appearance mood and psychomotor behavior and identify/respond to inappropriate/abnormal behavior>). While only 3 levels of hierarchy are shown in this illustrative example, the method and system disclosed can be applied to a hierarchy with a different number of levels.

Other Scenario Parameter categories can define further subcategories for a Scenario, including:

Setting <S>—specifies a setting where the scenario takes place. (e.g., "Hospital", "Clinic", "Geriatric Ward")

Age Group <A>—specifies an age group of the patient. (e.g., "Geriatric", "Pediatric", "Adult")

Topic <T>—A brief topic sentence describing a scenario. (e.g., "Assess client's appearance, mood, and psychomotor behavior in the context of arrhythmias.")

Individual scenario parameters and parameter vectors can be combined to define a Complete Question Scenario. By way of example a Complete Question Scenario can include a set of natural language values corresponding to each of the following parameter categories: Complete Question Scenario=[(<System, N> or <Concept,CN>) and <S> and <A> and <T> and <L2> and at least one of (<L2,L3>, <L2,L3, L4>)].

In at least some examples, the categories and combinations of parameters at one or both of the category or value level that are permitted in, or relevant to, a Question Scenario can depend on the type(s) of question(s) that the scenario corresponds to. Typically, standardized exams allow only certain question types (QT) (e.g., format types). Examples of sample question type QT formats for a typical RN certification are presented below in the format: abbreviation, QT name, QT description:

mc—multiple choice question—Allows the selection of a single or multiple responses from a pre-defined list.

sata—select all that apply (also known as "select all multiple response")—Allows the selection of multiple responses from a pre-defined list. Where the number of correct responses is not specified.

snmr—select n multiple response—Where the test taker is asked to select a specific number (i.e. n) correct responses from a pre-defined list of allowable responses with n<N (where N is the total number of responses). By way of example, if n is 5 and N is 10 for a question, the test-taker would be instructed to select 5 correct answers from a list of 10 possible answers.

mmr—matrix multiple response—In matrix multiple response questions a table is presented with a heading row and non-heading rows. In the heading row, the first column describes a category common to all statements in the first column's non-heading rows, while the headings for the $2^{nd}$ column and the columns thereafter describe categorizations. The non-heading rows consist of statements in the first column, and checkboxes in the remaining columns (to enable the categorizations in the columns to be associated with the statements in the rows). Multiple rows can be selected for each column.

mmc—matrix multiple choice—In matrix multiple choice questions a table is presented with a heading row and non-heading rows. In the heading row, the first column describes a category common to all statements in the first column of all non-heading rows, while the headings for the $2^{nd}$ column and the columns thereafter describe categorizations. The non-heading rows consist of statements in the first column, and radio buttons in the remaining columns such that only one column can be selected for each row, and each row must have one response item selected.

dragdc—drag and drop cloze—A test-taker is shown one or more sentences with one or more missing words or phrases. The position of these missing words or phrases are clearly marked (e.g. using empty boxes or blanks in the corresponding positions in the sentence) and the test taker is also shown possible words or phrases that could be inserted into those positions. The test taker is then asked to drag and drop the correct missing word or phrase to correctly complete the sentence or sentences.

dropdc—drop down cloze—Similar to drag and drop cloze except that the missing words and phrases are marked by drop down menus, and the missing words are selected via those drop down menus.

gmr—grouped multiple response—A grouped multiple response question type consists of a series of statements arranged in a table with two columns. In the first column are listed categories, and in the second column are listed multiple options. The test taker is asked to correctly select the options that correspond to each category. Each row must have at least one response option selected.

high—highlight—A highlight question type that allows students to highlight pre-specified blocks of text that meet certain criteria pre-specified in the question (for example, "requires follow-up" or "requires urgent attention") to demonstrate their understanding.

fbc—fill in the blank calculation—Allows a numerical response, possibly with units, that is graded by comparing against various model answers, possibly with tolerances.

hs—hotspot—Allows a student to drag and drop markers onto a background image.

Referring to FIGS. 2A and 3A, Scenario generation stage 200 starts with user device 102 and Web Server 104 initiating an examination question generation session that can include, as a first step, question type selection (Operation 202). As noted above, the types of parameters that are permitted in, or relevant to, a Question Scenario can depend on the question types that the question scenario corresponds to. With reference to FIG. 3A, the user device 102 presents a user with web page interface screen 303 that allows the user to select question types. In the illustrated example, the user is prompted to select one or more examination question type QT formats (e.g., "Multiple Choice", "Select All That Apply", "Select N Multiple Response", etc.), from a set of allowable examination question type QT formats such as those identified in previous paragraphs.

In some examples, when selecting question types, the user has the option to supply zero or one or more question types. For example, the user can either (i) input one or more desired question types (e.g., by inputting checks into the selection boxes next to the desired question format types in the case of interface screen 303); or (ii) not supply a question type (e.g., check zero boxes in interface screen 303), thereby indicating that the AQG system 100 can rely on LLM 114 to select one or more question type formats from the set of allowable examination question format types. Accordingly, the question type <QT> data that is sent to the Web Server 104 either indicates the selected question types, or that zero question type formats have been selected.

Once the Web Server 104 has received the list of one or more user selected question types <QTs> (or an indication of an absence of any selected QTs), a determination (Operation 204) is then made as what scenario parameters values and combinations of scenario parameter values are allowable for the provided list of question types <QTs>. In one example, the Web Server 104 performs this determination by submitting the list of question types <QTs> to the examination criteria DB server 116, which applies an algorithm to identify, based on the list of question types (QTs), what lists of question types, scenario parameter values and combinations of values are non-allowable, and then returns to the Web Server 104 the list of non-allowable question parameter values for the identified set of question types (QTs). In the one example, a list of non-allowable question parameters are returned for the chosen question parameter types in the following parameter type groupings:

Non-Allowable Scenario Parameters=a list of one or more groups of the form [<System, CN>,<Concept,CN>,<L2, L3, L4>]. Each listed group specifies a pattern of non-allowable values where in each group at least one of System, Concept, CN, L2, L3, or L4 is specified using operators such as equals (=), not equal (!=) and non-specified parameters are marked with a wildcard (in the example "*" to denote that they match any value). For example, the list item [<System="Cardiovascular", CN="*">,<Concept=*, CN=*>, <L2=*,L3=*,L4=*>] denotes that the Cardiovascular system is not allowable for the given question type, while the list item [<System="Nursing Skills and Fundamentals", CN="Leadership">,<Concept=*, CN=*>, L2="Management of Care", L3="Integrate advance directives into client plan of care", L4=*>] means that the combination of the <L2,L3> pair <"Management of Care", "Integrate advance directives into client plan of care"> and any <L2,L3> vector or <L2,L3,L4> vector where L2="Management of Care" and L3="Integrate advance directives into client plan of care" are not allowable for the given question type. Although in this example embodiment the allowable parameters are restricted based on System, CN, Concept, L2, L3, and L4, this technique can be used with any original parameters by extending the pattern groups. For example, additional parameters such as age group (A), or setting (S), could be added to not allow contradictory parameters, for example, the selection of Age Group (A)="Pediatric" when other parameters have been set to values exclusively relating to the geriatric population (e.g. System="Geriatrics" or the Setting S="Long Term Care").

Based on the set of non-allowable question parameters the Web Server 104, which has access to the complete list of possible parameters and parameter combinations (which, for example, can be part of the predetermined exam criteria/ rules), can subtract all matching non-allowable parameters from the corresponding sets of all possible parameters to obtain a corresponding set of Allowable Scenario Parameters <ASP>=a list of items of the form [<System, CN>, <Concept,CN>, <L2>, <L2,L3>, <L2,L3,L4>], for the list of selected question types <QTs>. Although in this example embodiment the variables System, CN, Concept, L2, L3 and L4 are shown, the set can be extended to include other parameters such as Age Group (A), and Setting (S). In an illustrated example, the Web Server 104 can present the Allowable Scenario Parameters <ASP> via a web page interface to user device 102 to enable a user to build and specify a Minimum Scenario Parameter Set <MSPS> that is used to constraint one or more Question Scenarios that will be generated in a later operation by the LLM 114.

In this regard, FIG. 3B shows an example of a user interface display 304 that allows a user to use a drop-down menu to select a Minimum Scenario Parameter Set <MSPS> for a System-Concern <System, CN> pair. The user can select: (i) a System value (e.g., Cardiovascular) from a drop-down list 306 of the Systems included in the list of allowable system-concern <System, CN> pairs, (ii) a corresponding concern <CN> value (e.g., Angina) from a drop-down list 308 of the Concerns included for the selected <System> value in the list of allowable System-Concern <System, CN> pairs, and (iii) one or more L2 Client Need areas from a displayed set 310 of allowable L2 values (e.g., "Health Promotion and Maintenance", and "Basic Care and Comfort").

Although FIG. 3B shows an example of a user interface display 304 that allows a user to use a drop-down menu to select a Minimum Scenario Parameter Set <MSPS> for a System-Concern <System, CN> pair, a similar user interface display can be provided that allows a user to select a Minimum Scenario Parameter Set <MSPS> for a Concept-Concern <Concept, CN> pair.

In addition, user interface display 304 can also include an interactive input field 312 that enables the user to specify a quantity (N) of Question Scenarios that are to be generated in a subsequent operation.

In some examples, additional selection menus can optionally be provided for the Client Needs sub-areas L3 that are allowable based on the selected L2 values, as well as L4 values that are allowable based on any selected L3 values as well as for other Scenario Parameters (e.g., Age Group <A>, Setting <S> and Topic <T>). However, in the presently described the Scenario Parameter vectors <L2,L3>, <L2,L3, L4> and Scenario Parameter Age Group <A>, Setting <S> and Topic <T> are omitted from user selection and instead generated by the LLM 114 in Operation 212 described below.

The Minimum Scenario Parameter Set <MSPS> obtained by the Web Server 104 is an MSPS vector consisting of QTs, N, and one of (<System, CN> OR<Concept, CN>), and at least one L2 value.

In an example embodiment, in Operation 208, the Web Server 104 sends the MSPS vector to the API Server 106. The API Server 106 is configured to generate (Operation 210) a respective Scenario Prompt SP for the LLM 114 that instructs the LLM 114 to perform a Scenario Generation Task. In the regard, the API Server 106 can use the values included in a received MSPS vector to automatically populate fields in a predefined SP template. The purpose of the Scenario Generation Task is to generate a set of N Complete Question Scenarios (e.g., multiple unique versions of Complete Question Scenarios) based on the Minimum Scenario Parameter Set <MSPS>. For example, if the Minimum Scenario Parameter Set <MSPS> specifies (<System, CN> OR<Concept, CN>) value pair and an L2 value, then the Scenario Generation Task is performed to generate N sets of values for <L2,L3> and <L2,L3,L4> parameter vector groups and Age Group A, Setting S and Topic T parameters.

In one example, natural language instructions that SP prompt can include is identified in the following Table 1, which illustrates an example of some instructions that can be included in a prompt template. The right column of Table 1 (and similar tables below) shows the content of the prompt template. The left column is an illustrative description of the content. The API Server 106 auto-populates the fields that are designated with brackets "{{ }}" in the prompt template. In at least some examples, prompt templates can include embedded JSON options (e.g., if input="A" then do "B") that instruct the API Server 106 to automatically customize the instructions that are included in the generated prompt.

TABLE 1

Scenario Prompt SP Template Content

| Description Of Content | Example Template Content |
| --- | --- |
| A perspective that the LLM is to take when performing the task | "You are an NCLEX question writer." |
| High level description of Minimum Scenario Parameters being provided | "I will give you a pair that are either a system and concern or a concept and concern, and client need area(s) (collectively a "base scenario")." |
| Expected output parameter categories | "For each base scenario, provide {{N}} realistic combinations of (1) disease or condition. (2) question topic. (3) setting (e.g., hospital, homecare, etc.). (4) age_group (i.e., Pediatric or Geriatric or Adult). (5) L3 (where L3 is a sub-area of client need area). (6) L4 (where L4 is a sub area's sub-area, a sub-area of L3). (7) possible question types (chosen from the list of possible question types to choose from)." |
| Constraints on output parameter categories | "In the context of a realistic patient scenario in an NCLEX question L4 must be a sub-area of L3, and L3 must be a sub-area of the client need areas. A full list of allowable client need areas and their sub-areas and sub-area's sub areas are {{Full list of client need areas and their sub-areas and sub-area's sub area}}" |
| The Actual Minimum Scenario Parameters | "Here is the base scenario: system: {{System}} concern: {{Concept}} client need areas: {{L2}} possible question types to choose from: {{QTs}} |
| Explanation of Question Types (QTs) | "Here is the explanation of each question type: "mc—multiple choice question—Allows the selection of a single or multiple responses from a pre-defined list. . . . sata—select all that apply (also known as "select all multiple response")—Allows the selection of multiple responses from a pre-defined list. Where the number of correct responses is not specified. . . . snmr—select n multiple response—Allows the selection of multiple responses from a pre-defined list. Where the number of correct responses is specified in advance as n and given to the user as part of the question. |
| Expected output format and example(s) | "Give your response in JSON Here is an output format example: { "responses": [ { "disease_or_condition": "Unstable Angina", "question_topic": "Organizing and delegating tasks to ensure timely care", |

TABLE 1-continued

Scenario Prompt SP Template Content

Description Of Content Example Template Content

```
    "setting": "Hospital",
    "age_group": "Adult",
    "L3": "Assignment, Delegation and Supervision",
    "L4": "Organize workload to manage time effectively",
    "possible_question_types": "mc"
},
...]"
```

The API Server 106 sends the Scenario Prompt SP to the LLM 114, instructing the LLM 114 to write a quantity N of scenarios for each MSPS vector.

The LLM 114 generates (Operation 212) the N Proposed Scenarios PS in JavaScript Object Notation (JSON) format and sends the set of Proposed Scenarios PS=Quantity N of [(<System, CN> OR<Concept,CN>), L2, <L2,L3>, <L2,L3, L4>, S, A, T] back to the API Server 106. Each of the Proposed Scenarios PS represents a respective Complete Question Scenario that include the parameters <L2,L3>, <L2,L3,L4>, S, A, T that were not included in the Minimum Scenario Parameter Set <MSPS>.

The API Server 106 sends (Operation 214) the N Proposed Scenarios PS Quantity N of <(<System, CN> OR<Concept,CN>), <L2, L3, L4>, S, A, T> to the Web Server 104, which in turn sends (Operation 216) the Proposed Scenarios PSs to AQG database DB 108 for storage (Operation 218). The Web Server 104 also presents (Operation 216) the Proposed Scenarios PSs via a webpage interface and user device 102 to a user.

As indicated at Operation 220, a user can interact with user device 102 to accept, reject, delete, or edit the parameter values included in each of the proposed scenarios PS, subject to predefined restrictions. By way of example, FIG. 3C shows an example of an interactive interface display 314 that can be presented to a user via user device 102 that shows the values for parameters <System, CN, L2, L3, L4, S, A, T> for N=4 Proposed Scenarios (PSs), namely proposed scenarios PS1 to PS4. The user can edit selected parameters for each of the scenarios by, for example, selecting a parameter that will then cause a drop-down menu of acceptable replacement parameter inputs to be displayed for user selection. In some examples the topic sentence (T) can be directly text edited by a user. In the illustrated example, the "Actions" column allows a user to individually tag the Proposed Scenario PSs as "use" or "delete". The set of M (where M<=N) proposed scenarios PS1 to PS4 that the user selects (by tagging as "use") form the set of M User Approved Scenarios UAS=quantity M of [<System, CN> OR<Concept, CN>, <L2, L3, L4>, S, A, T_e], where T_e denotes the topic parameter after user review.

In an example embodiment, in Operation 222, the Web Server 104 is configured to determine if a verification process 223 is required in respect of a User Approved Scenario UAS. For example, the Web Server 104 can be configured to determine that verification process 223 is required for a User Approved Scenario UAS when a free text parameter (for example the topic parameter T_e) has been edited by a user. Such a verification may be used to confirm that the edited free text field does not include improper content, for example content that will result in a nonsensical or incorrect question or content that includes malicious or offensive terminology. Accordingly, in Operation 222, when the Web Server 104 determines the verification process 223 is required (e.g., such a determination can be made when a free text parameter field of a User Approved Scenario UAS has been edited), the Web Server 104 sends the User Approved Scenario UAS [<System, CN> OR<Concept, CN>, <L2, L3, L4>, S, A, T_e] to API server 106 for verification. Otherwise, the User Approved Scenario UAS is treated as finalized (Operation 230).

For each User Approved Scenario UAS that is deemed to require verification, the verification process 223 (collectively Operations 224, 226, 228) can be as follows. In one example, in Operation 224, the API server 106 performs an initial check to determine if the edited User Approved Scenario UAS meets an initial set of verification criteria. In one example, this initial check includes confirming that any user edited free text parameters (e.g., topic parameter T_e) included in the User Approved Scenario UAS is free of pre-specified improper or malicious terminology (e.g., the edited text is compared against a predefined list of prohibited key phrases or keywords). If the edited text includes prohibited terminology, an indication that the edited text is non-allowable is generated (e.g., an error result, (E) is generated) and returned to the Web Server (Operation 228) and the verification process 223 is completed with a negative result for the subject User Approved Scenario UAS. In some examples, the initial check of Operation 224 can be used to prevent the use of computer and network resources required for an unnecessary prompt processing call to LLM 114.

If the case where the edited User Approved Scenario UAS meets the initial set of verification criteria applied in Operation 224, the the API Server 106 generates a validation prompt VP to query the LLM 114 to perform a further verification that the user edited content of the free text field (T_e in this case) is valid for the Scenario and does not include malicious or improper content. The validation prompt VP is sent to LLM 114, which processes the prompt (Operation 226) to ensure that free text field content (e.g., T_e) corresponds to a valid scenario and is not malicious. If the content of the free text field (e.g., T_e) corresponds to a valid scenario and is not deemed malicious, the LLM 114 sends the approved content back to the API Server 106, otherwise an indication that the edited text is non-allowable is generated (e.g., error result (E)) and returned to the API Server 106. API Server 106 in turn sends (Operation 228) the free text field validation results [Verified Topic T_e or Error Result "E" ] to the Web Server 104. In some examples where an error result is returned, blocks 220 to 228 may be repeated in respect of the rejected scenario to enable a user to correct the error.

At the completion of Question Scenario Generation Stage 200, the Web Server has a finalized set of M user approved scenarios UASs (Operation 230).

In some examples of question scenario generation stage 200, for example when the user does not have the opportunity to perform any free form editing of parameter variables, Operations 222 to 228 can be omitted (e.g., the operations represented in the flow diagram of FIG. 2A will go directly from Operation 220 to Operation 230).

The Question Generation Stage 250 will now be described with reference to FIG. 2B. Question generation stage 250 begins with Web Server 104 providing the M User Approved Scenarios UASs to API Server 106 (Operation 252) with a request for API Server 106 to generate a question for each User Approved Scenarios UAS. ("Web Server"→"API Server" Quantity M of selected [<System, CN> OR<Concept,CN> AND <L2, L3, L4>, S, A, T_e])

In some examples, API server 106 is configured to retrieve context information (Operation 254) about one or more of the Scenario parameter values, for example, context about specified Scenario Sub-Topic (e.g., a disease or condition specified as a Concern CN). The context information can, for example, be obtained from a source such as Reference DB 110. In one example, Reference DB 110 is preconfigured with, or otherwise has access to, reference data that is related to the subject matter that the examinations questions are being generated in respect of.

In some examples the reference data may be obtained from a set of references that are pre-specified by an organization that sets standards related to a certification examination that the examination is being generated in respect of, or that match the criteria set form by the organization that sets such standards. In some examples, the references may be specified in the predetermined examination criteria. The reference data can, for example, be arranged as context chunks of text, with each context chunk being stored with metadata that can for example identify the source for the context chuck. The metadata can, for example, include reference identifiers (e.g., book or paper title, publication date, author, publication number (e.g., International Standard Serial Number (ISSN), International Standard Book Number (ISBN), Digital Object Identifier (DOI), and/or other identifiers) that identify a source reference that the context chunks originated from and index data (e.g., line, paragraph and/or page numbers, chapter, heading, sub-heading) indicating where the text chuck is located in the source reference.

The context that is available from Reference DB 110 can be useful when generating examination questions as it is a common requirement in medically-related standardized exams that the question be answerable using information from a specific set of references or commonly used references. Operation 256 provides context chunks of text from those references (with each context chunk labeled with the name of the reference, and page number, and optionally heading or sub-heading) that can inform the LLM 114 in subsequent operations about what is in the references on the topic it is asked to write a question about.

Accordingly, in some examples, API Server 106 can be configured to query Reference DB 110 to search for and return context information (CONTEXT) relating to one or more of the scenario parameters [CN, L2, L3, L4, T_e]. In some examples, the context gathering Operations 254 and 256 can be omitted.

In Operation 258, API server 106 is configured to create a respective Question Unit Prompt QP for each User Approved Scenario UAS. This can be performed, for example, by inserting the parameter values from each User Approved Scenario UAS=[<System, CN> OR<Concept, CN> AND <L2, L3, L4>, S, A, T_e], along with any context information (CONTEXT) into a question prompt template that is pre-defined for each question type.

An example of content for a multiple-choice MC Question Unit Prompt QP template is shown in Table 2 below:

TABLE 2

| Multiple-Choice Question Type Prompt QP Template | |
| --- | --- |
| Description of Content | Example Template Content |
| A perspective that the LLM is to take when performing the task | "You are an NCLEX question writer." |
| High level description of expected LLM output | "Write a multiple choice question with 4 answer choices in the style of the NCLEX relating to the NCLEX client need areas: '{{L2}}', '{{L3}}', and '{{L4}}'." The question should relate to a {{disease}} {{age_group}} client in a {{setting}} setting. The question topic should be '{{topic}}'. |
| Indication of a cognitive level in Bloom's Taxonomy (a taxonomy that categorizes different levels of thinking) | "Make sure the question is at the application or at the analysis level of Bloom's taxonomy." |
| Indicate Components of the JSON response (e.g., Keys) to include in the Question Unit, and formatting instructions for at least some of the Components | "Include the following keys in your response: (1) QUESTION; (2) ANSWER_CHOICES that include a correct answer and 3 wrong answers that serve as distractors; (3) LEARNING_OBJECTIVE; (4) BACKGROUND, where you provide the context and knowledge the student needs to understand the question and answer choices, and the knowledge and context needed to answer the question correctly; (5) TAKEAWAY, where you summarize the key learnings from the question in a few sentences; and (6) REFERENCES, in which you list 2 to 3 of the most appropriate references that could be used to answer the question from a list of references I will provide." |
| List of Allowable References | "The list of references you can choose from are: . . . Harding, M., Kwong, J., Hagler, D., & Reinisch, C. (2023). Lewis's Medical-Surgical Nursing: Assessment and Management of Clinical Problems. Elsevier, Inc. Ignatavicius, D. D., Rebar, C. R., Heimgartner, N. M. (2024). |

TABLE 2-continued

Multiple-Choice Question Type Prompt QP Template

| Description of Content | Example Template Content |
|---|---|
| | Medical-Surgical Nursing: Concepts for Clinical Judgment and Collaborative Care. Elsevier, Inc. . . ." |
| Example of a Question Unit | "An example response is below: {"QUESTION": "A nurse is caring for a client with advanced Chronic Obstructive Pulmonary Disease (COPD) who has been discussing end-of-life care preferences. The client expresses a wish to avoid aggressive life-saving measures. Which action should the nurse take to best integrate the client's advance directives into the plan of care?", "ANSWER_CHOICES": [{"text":"Inform the health care provider about the client's wishes and collaborate to review the care plan", "IsCorrect": true, "RATIONALE": "This is the most appropriate action as it respects the client's autonomy and ensures that their advance directives are considered in the plan of care. Collaboration with the health care provider is essential to integrate the client's end-of-life preferences."}, {"text": "Advise the client to reconsider since treatment options for COPD are constantly evolving", "IsCorrect": true, "RATIONALE": "It is not appropriate to advise the client to reconsider their wishes for end-of-life care based on potential future treatments, especially when they have made their preferences clear."}, {"text": "Wait until the family is present to discuss the advance directives and DNR orders", "IsCorrect": true, "RATIONALE": "While family discussions about advance directives are important, it is not appropriate to wait for family presence to take action on a client's expressed wishes."}, {"text": "Document the client's preferences in the medical record without notifying the health care provider", "IsCorrect": true, "RATIONALE": "Simply documenting the client's preferences is not sufficient; the nurse must also communicate these wishes to the health care provider to ensure they are acted upon."}], "LEARNING_OBJECTIVE": "Integrate a client's end-of-life preferences into their plan of care while respecting their autonomy and ensuring collaboration with the health care team.", "BACKGROUND": "Advance directives are legal documents that allow clients to convey their decisions about end-of-life care ahead of time.", "TAKEAWAY": "Advance directives should be integrated into the client's plan of care in a collaborative manner, respecting the client's autonomy and ensuring clear communication with the health care team.", "REFERENCES": ["Harding, M., Kwong, J., Hagler, D., & Reinisch, C. (2023). Lewis's Medical-Surgical Nursing: Assessment and Management of Clinical Problems. Elsevier, Inc.", "Ignatavicius, D. D., Rebar, C. R., Heimgartner, N. M. (2024). Medical-Surgical Nursing: Concepts for Clinical Judgment and Collaborative Care. Elsevier, Inc."]}" |
| Output Format Instructions (e.g., format to enable computer to computer communication) | "Your response should be a valid RFC8259 compliant JSON conforming to the following JSON schema: . . ." |

In examples where optional context information (CONTEXT) is acquired in Operations 254 and 256, then the Q Prompt is drafted in Operation 258 to instruct the LLM 114 to increase the chances that the resulting question it writes is answerable using the references in the context.

If a pre-specified list of references (i.e. LREFS) is provided, then the Q prompt is drafted to instruct the LLM 114 to only choose from those references.

The Question Unit Prompt QP for each User Approved Scenario UAS is then provided to LLM 114 for processing. LLM 114 generates a respective JSON format Question Unit Q in response to each question prompt QP it receives (Operation 260), and returns each generated Question Unit Q to the API Server 106.

In the illustrated example, each Question Unit Q can include the following components:

(1) QUESTION—the question, in natural language text, that is the examinee is presented with to answer.

(2) ANSWER_CHOICES—a set of answers choices, each answer choice including: (i) natural language text of the answer, and a RATIONALE sub-key including (ii) an indication that the answer choice is correct or not (e.g., "IsCorrect": "false" or "true") and (iii) explaining why the answer choice is correct or incorrect.

(3) LEARNING_OBJECTIVE—Natural language text explanation of a learning objective associated with the question.

(4) BACKGROUND—Natural language text explanation of context and knowledge needed to understand the question-and-answer choices, and the knowledge and context needed to answer the question correctly).

(5) TAKEAWAY—Natural language text summary of the key learnings from the question in a few sentences; and (6) REFERENCES—list of the most appropriate references that could be used to answer the question, selected from the provided list of possible references.

In some examples, the API Server 106 sends (Operation 262) each generated Question Unit Q to the AQG database DB that then stores the Question Units Q (Operation 264).

An example of a JSON structured Question Unit Q generated by LLM 114 is illustrated below in TABLE 3.

TABLE 3

Illustrative Structured Question Unit Q, In JSON Format

{
"QUESTION": "A nurse is caring for a client with advanced heart disease in a cardiac care unit
who has a Do Not Resuscitate (DNR) order. Which action should the nurse take to ensure the care
plan reflects the client's DNR status most accurately?",
"ANSWER_CHOICES": [
{
"text": "Confirm the DNR order with the healthcare provider",
"IsCorrect": true,
"RATIONALE": "Confirming the DNR order with the healthcare provider ensures that the care
plan is aligned with the client's wishes and legal documents, promoting ethical care practices."
{
"text": "Discuss the DNR order with the client's family only",
"IsCorrect": false,
"RATIONALE": "While family involvement is important, the primary action is to confirm the
DNR status with the healthcare provider to ensure it is accurately reflected and followed in
the
care plan."
},
{
"text": "Immediately initiate CPR if the client experiences cardiac arrest",
"IsCorrect": false,
"RATIONALE": "Initiating CPR contradicts the DNR order, which explicitly states that
resuscitation should not be performed."
},
{
"text": "Place the DNR order in a less visible part of the medical record",
"IsCorrect": false,
"RATIONALE": "The DNR order should be prominently displayed in the medical record to
ensure it is seen and followed by all healthcare team members."
}
"LEARNING_OBJECTIVE": "Manage care effectively by ensuring that advance directives,
specifically DNR orders, are accurately integrated and reflected in the client's plan of care.",
"BACKGROUND": "Do Not Resuscitate (DNR) orders are critical legal documents that state
a
client's wishes regarding resuscitation efforts in the event of cardiac or respiratory arrest. It is
crucial for healthcare providers to adhere to these directives to respect the client's autonomy
and
legal rights. In a cardiac care setting, where clients may be at increased risk of cardiac events,
ensuring that DNR orders are accurately documented and communicated across the care team
is
essential. This involves confirming the order with the healthcare provider who can verify its
presence and validity, ensuring it is visible in the client's medical record, and educating all
staff
involved in the client's care about the order. Failure to properly document or follow a DNR
order
can lead to unwanted resuscitative efforts, which not only contravene the client's wishes but
may
also cause unnecessary suffering and legal issues.",
"TAKEAWAY": "DNR orders must be clearly documented and confirmed with healthcare
providers to ensure they are respected and implemented correctly, reflecting the client's wishes
in their plan of care.",
"REFERENCES": [
"Harding, M., Kwong, J., Hagler, D., & Reinisch, C. (2023). Lewis's Medical-Surgical Nurs-
ing:
Assessment and Management of Clinical Problems. Elsevier, Inc.",
"Ignatavicius, D.D., Rebar, C.R., Heimgartner, N.M. (2024). Medical-Surgical Nursing: Con-
cepts
for Clinical Judgment and Collaborative Care. Elsevier, Inc."
]
}

The Question Review and Enhancement Stage 265 will now be described with reference to FIG. 2C. The purpose of this stage is to refine the generated Question Units Q by ensuring that both the correct and incorrect answer choices are logically sound and appropriately challenging, thereby enhancing the overall quality of the questions.

At Operation 266, the API server 106 is configured to generate a Review and Improvement (RI) prompt for each Question Unit Q. The RI prompt is designed to instruct the LLM 114 to critically assess the question and its associated answer choices. For example, in this step, the LLM 114 is instructed to:

(1) Verify that the correct answer choice is accurate and requires thoughtful consideration to identify it as the correct answer.

(2) Ensure that the incorrect answer choices (distractors) are plausible and not easily dismissible, thus preventing the student from selecting the correct answer without critical thinking.

(3) Ensure that the question text does not reveal the answers.

(4) In the event that a user has identified any deficiencies (e.g., through feedback provided in Operation 267C described below), ensure that the deficiencies are addressed.

In Operation 266, the API server 106 populates the RI prompt template with the content of the Question Unit Q in JSON format. The prompt includes detailed instructions guiding the LLM 114 on how to evaluate and enhance the question.

At Operation 267, the LLM 114 processes the RI prompt and generates a refined version of the Question Unit Q. The LLM 114 may, for example, amend the Question Unit Q to in one or more of the following ways: rephrase the question stem to increase clarity; adjust the correct answer choice to make it less immediately apparent; and/or modify the incorrect answer choices to be more convincing and less obvious distractors.

This process ensures that each question is reviewed and optimized to reduce the likelihood that students can arrive at the correct answer without using logic or reasoning skills to ensure that the question is at least at the application level of Bloom's taxonomy and that the answer choices are not obvious in support of more accurate testing of ability to practice and to promote reflection and deeper learning on the part of the test-taker.

In the illustrated example, the refined Question Unit Q is provided to API server 106, which passes (Operation 267A) the refined Question Unit Q to Web Server 104 for presentation (Operation 267B) to the user via a GUI presented on the user device 102. As indicated in Operation 267C, a user can interact with user device 102 to "accept" or "reject" the presented Question Unit Q and optionally provide feedback on deficiencies in the presented Question Unit Q. In some examples, this feedback may be provided through a free-text natural language input field and/or selected from pre-defined options such as: "the distractors are too obvious", or "the information in the exhibits gives the answer away", or "answer choices are too similar", "wording of question has ambiguous meaning" or "question itself is confusing". In some examples, the presented GUI enables the user to provide feedback by highlighting portions of the Question Unit content they find problematic and indicating (using natural language inputs, or through selection of predefined options) suggested changes or improvements to the highlighted Question Unit content.

At Operation 267D, the results of the user's review are then passed on to the API server 106. At Operation 267E, API Server 106 determines if the user's review results indicate that refined Question Unit Q has received user approval, and if so (e.g., Accepted=yes), continues to Operation 268 and sends the refined Question Unit Q to AQG DB 108 for storage (Operation 269).

If, at Operation 267E, API Server 106 determines that user's review results indicate that refined Question Unit Q has been rejected (e.g., Accepted=no), then the API Server 106 will return to Operation 266 and generate a further RI prompt for LLM 114 that incorporates user feedback received in Operation 267C. This results in instructions being added to the RI prompt to rephrase that specific section of the question to address the declared deficiency and/or suggested improvements. Operations 266 through 267E can be repeated until the user accepts the refined Question Unit Q (or until a defined number of attempts have occurred).

In some examples, the user verification performed at operations 267A to 267E can be omitted.

Table 4 below illustrates an example of content that can be included in an RI prompt template for a multiple-choice question type. A similar prompt template is used for all other question types.

TABLE 4

Example RI Prompt Template

| Description Of Content | Example Template Content |
| --- | --- |
| A perspective that the LLM is to take when performing the task | "You are an NCLEX question writer." |
| Provide the Question Unit Q | I will provide you a multiple-choice question in JSON format.<br>Review the question and make any necessary changes to improve its quality. Ensure that the correct answer is accurate<br>and that all answer choices are logically sound, are at the application level or higher level of Bloom's taxonomy, and are appropriately challenging. <question> {{question}} </question> |
| Review Instructions | "<instructions> Assess the question and answer choices to ensure: 1. The correct answer is not too obvious and requires<br>critical thinking to identify. 2. The incorrect answer choices are plausible and relevant to the question topic. 3. None of the answer choices are too easy, meaning that a student cannot select the correct answer without thoughtful analysis. If any answer choices are too easy or not sound, modify them<br>to enhance their quality. Provide the revised question and answer choices...</instructions>" |
| Output Format Instructions | "The response must conform to the following JSON schema:... " |

An example of the LLM-generated response to an RI prompt may include a revised question and updated answer choices that reflect improvements in complexity and plausibility. The JSON structured question output will follow the same structure as illustrated in Table 2B3.

In Operation 268, the refined Question Unit Q is received from the LLM 114 by API server 106 and sent to AQG database 108 for storage (Operation 269).

Accordingly, in Question Review and Enhancement Stage 265 at least some of the structured Question Unit content is inserted into RI prompt template. The RI prompt template includes instructions for the LLM 114 to review the structured Question Unit content to ensure it meets a specified criteria and refine the content if required to meet the specified criteria. Any refinements made by the LLM 114 in respect of the content are incorporated into the Question Unit content.

In some alternative example implementations, in Operations 267B and 267C, a user can be given the opportunity to request that additional variants be generated for the Question Unit Q that is under currently under review. The practice of creating variants of the same question is a practice sometimes used to improve exam security by enabling different variants of the same question to be distributed to different test-takers. Thus, in some examples (for example, for question types with multiple answer choices) in Operation 267C the user is provided with an option to "Accept" the Question Unit Q and also request that a specified number (e.g., one or more) variants of the Question Unit Q be created (for example, each variant can have different distractors, and/or one or more rephrased correct answer choices, and/or a modified question stem in which case both the correct answer and distractors may change). In some examples, the types of question variants can be user specified. In some cases, the types of question variants can be predefined based on the type of question that is to be varied.

In the event that a user requests one or more question variants, one or more further LLM prompts are generated by the API server 106 to instruct that to LLM 114 to provide the specified number and types of question variants. In example embodiments, the operations of Question Review and Enhancement Stage 265 can be repeated for each of the variants. The one or more further LLM prompts can include the content of the original Question Unit Q, together with instructions that describe the types of variant(s) that are requested. For example, the prompt instructions could specify "provide a variant of the provided Question Unit that includes different distractors" or "provide a variant of the provided Question Unit that includes a rephrased correct answer choice" or "Provide a variant of the provided Question Unit that includes a modified question stem, together with the correct answer choice and distractors for the modified question stem".

In examples where multiple variants of a Question Unit are generated, both the original Question Unit and its variant Question Unit(s) are stored in the AGQ DB 108. The original Question Unit and its variant Question Unit(s) can each be assigned a respective ID (or otherwise tagged with metadata) that indicates that the Question Units are all unique variants derived from a common Question Unit, thereby allowing a downstream LMS 112 to use the Question Unit variants as question alternatives for test differentiation. In at least some examples, one or more finalized question record can be stored in one or both of the AGQ DB 108 and LMS 112 (for example, see Operations 290, 292 described below) that includes the original Question Unit and its variant Question Unit(s) with information that indicates that the variants are all alternative versions of the original Question Unit.

Each of the Question Unit Variants can be processed independently for answerability and final verification purposes in stages 270 and 293 described below.

The Tagging and Answerability Stage 270 will now be described with reference to FIG. 2D. The purpose of Tagging and Answerability is to provide tags that can be used to index Question Units Q for future searching and to ensure that the question that is included in a generated Question Unit Q is answerable based on a defined set of references.

As illustrated by Operations 272 and 274, in some examples, API server 106 is configured to retrieve checking and answerability (C&A) context from the Reference DB 110 to support checking answerability based on the previously described context information that is stored at Reference DB 110.

In one example, in Operation 272 API server 106 prepares a set of C&A context queries for Reference DB 110 based on information that is included in both the generated Question Unit Q and the question prompt QP that was used to generate the Question Unit Q. In some examples, the C&A context queries are each provided individually to Reference DB 110 and a respective C&A context response is received for each C&A context query. The use of multiple C&A context queries and respective responses allows different approaches to be taken to extract information from the Reference DB 110. The query responses are aggregated and used for future LLM prompting.

For example, each C&A context query can include keywords consisting of the concatenation of one or more of the following: D (e.g., disease, procedure or condition), C (e.g. complication), client need areas: <L2> or <L3, L4>, or <T_e> (topic). Each context query can also include one or more of the following data components parsed from the Question Unit Q: [Q_Question, Q_Correct_Answer, <Question_Wrong_Answer(s)>Question_Learning_Objective, Q_Takeaway]. The use of different data components in different C&A context queries that are included in the set of C&A context queries can, in some examples, provide better overall context data. For example, one query that included data from one question component may fail to retrieve the best context that can otherwise be obtained using queries that included data from other components. For example, in some implementations, to provide optimal context results, a first C&A context query can be performed based on Background, a second C&A context query preformed based on T_Takeaway, and a third C&A context query performed based on Questions_Learning_Objective. Each C&A context query returns a few responses and all of the responses can be aggregated into a combined context response. In some examples only one copy of any duplicated chunks is kept in the combined context response.

When providing C&A context in Operation 274, the Reference DB 110 is configured to perform vector, keyword or phrase matching to match the content for each of the context query data components to reference data stored as chunks in the Reference DB 110 and return a set of data chunks as support for each of the context query data components. In one example, five (5) context chunks (each including about 1024 text characters, by way of non-limiting example) are retrieved from the Reference DB 110 for each of the identified context query data components. Each context chunk is labelled with a reference identifier and index data as previously described.

At Operation 276, the API server 106 is configured to generate a first answerability (A1) prompt for each Question Unit Q. In the illustrated example, the A1 prompt is configured to cause the LLM 114 to (1) identify system-concern pairs that apply to the question; (2) indicate a cognitive level required to answer the question; and (3) indicate a level of difficulty of the question. In this regard the LLM 114 is instructed generate a list of tags that include tags indicating system-concern pairs, cognitive level, difficulty level. The system-concern tags can only be selected from a pre-specified list of system-concern tag pairs embedded in the A1 prompt. Choices for the cognitive and difficulty level tags are also set out in the A1 prompt.

Thus, in an example implementation, in operation 276, the API Server 106 populates an A1 prompt template (e.g., "Insert <Q> into A1 Prompt Template"), and then sends the A1 prompt to LLM 114 (e.g., "API Server"→"LLM" [SCT Prompt]. In some examples, the A1 prompt template may be dependent on the question type QT, in which case the API Server 106 will select the appropriate template from a set of prespecified Question Type QT based prompt templates.

The LLM 114 responds to API Server 106 with a list of applicable system-concern tags, a cognitive level tag and a difficulty level tag (e.g., "Tags"). The LLM 114 response can, for example, be described as "LLM"→"API Server" [Tags].

Table 5 below illustrates an example of content that can be included in a System and Concern Tagging A1 prompt template for a multiple-choice Question Type.

TABLE 5

| Example A1 Prompt Template Multiple Choice Question Type | |
| --- | --- |
| Description of Content | Example Template Content |
| Provide the Question Unit Q | "I will provide you a question in JSON format and a query. Fulfill the query based on the multiple choice question by replying with a valid RFC8259 compliant JSON response.<br><question><br>{{question}}<br></question>" |
| Query Instructions<br>(Includes instructions to create list of System and CN Tags, and also a tag indicating a cognitive level required to answer the question and a tag that indicates a difficulty level) | "<query><br>In a JSON key called 'Tags' choose between 1 to 10 of the most applicable pairs of system and concern tags from a tab-delimited list of pairs of tags I will provide that best relate to the primary foci of the question.<br>Each row of tags in the tab-delimited list represents a pair of tags. The first tag listed in each row is the system tag, and the second tag listed in each row is a concern tag.<br>Provide your output solely as a JSON list with the system and concern tags listed individually and without repetition.<br>Provide 1 tag that best describes the Bloom's taxonomy level needed to answer this question from this JSON list of tags: ["Bloom_Knowledge", "Bloom_Comprehension", "Bloom_Application", "Bloom_Analysis", "Bloom_Synthesis", "Bloom_Evaluation"].<br>Also Provide a difficulty level tag appropriate for the question from this list: adpq_1, adpq_2, adpq_3 (which respectively represent low, medium and high difficulty). Choose adpq_1 if the question (i) requires one step of reasoning; or (ii) the question is a recall or comprehension question; or (iii) the question is a simple application question; or (vi) the question is a simple evaluation question.<br>Choose adpq_2 if the question is a complex application question.<br>Choose adpq_2 or adpq_3 for the difficulty level tag if (i) the supplied question is a at the analysis level of Bloom's taxonomy; or (ii) the supplied question asks what interventions are inappropriate; or (iii) the supplied question asks what findings require follow-up; or (iv) the client has multiple complications.<br>. . .<br>. . . " |
| List of System-Concern Tags | "Below is the list of tab-delimited pairs:<br>S_Cardiovascular C_Angina<br>S_Cardiovascular C_Arrhythmias<br>S_Cardiovascular C_Aortic Complications<br>S_Cardiovascular C_Cardiomyopathy<br>. . . "<br>S_Community Health C_Cardiovascular Health |
| Example Response | "An example response is below:<br>{"Tags":["S_Management of Care","C_Advocacy","C_Client Rights", "S_Respiratory","C_Chronic Obstructive Pulmonary Disorder (COPD)/Emphysema", "Bloom_Application","adpq_2"]}" |
| Output Format Instructions (e.g., format to enable computer to computer communication) | "The response must conform to the following JSON schema:... " |

An example of the LLM generated response to an A1 Prompt can include a list of Tags, along with for example:
"Tags": [
  "S_Cardiovascular",
  "C_Client Rights",
  "S_Community Health",
  "C_Client Rights",
  "Bloom_Application",
  "adpq_2"

In some examples, the A1 prompt can be split into multiple prompts, for example, one prompt for System-CN pair tagging, one prompt for cognitive level indication and, and one prompt for difficulty level indication. The use of multiple prompts will increase prompt calls but may in some use cases provide a faster overall response as the multiple simpler prompts can be sent in parallel, thus reducing user wait time.

At Operation 280, the API server 106 is configured to populate a second answerability (A2) prompt template for each Question Unit Q. In the illustrated example, the A2 prompt is configured to cause the LLM 114 to satisfy the following objectives:

1. Identify concept-concern pairs that apply to the question—the LLM 114 is instructed to list concept-concern pairs of tags relevant to the question that is the subject of the Question Unit Q. The tags can only be selected from a pre-specified list of concept-concern tag pairs embedded in the A2 prompt.

2. Identify and supply reference ranges (RR)—In some standardized exams, answers require a variable range. For example, in the case of standardized RN examinations, the normal ranges for lab values must be displayed in Question Units that contain lab values. Accordingly, the TRR prompt is configured to instruct the LLM 114 to identify all lab values that require reference ranges and to supply those reference ranges.

3. Confirm that the question can be answered from the references included in the C&A context acquired in Operations 272 and 274, and identify the supporting reference data (e.g., provide identification of Relevant Passages (RP) from references that could be used to answer the question).

Thus, in an example implementation, in operation 280, the API Server 106 populates an A2 prompt template, and then sends the prompt to LLM 114 (e.g., "API Server-"→"LLM" A2 Prompt). The LLM 114 generates a response (Operation 282) and returns the response to API Server 106 with a list of applicable concept-concern tags (e.g., "Tags"), identification of all lab values that require reference ranges and the applicable reference ranges, and a confirmation that the question is (or is not) answerable based on a list of references.

In some examples, similar to the A1 prompt, the A2 prompt can alternatively be split into multiple prompts.

At Operation 288, the API Server 106 assembles a Question Record QR for each Question Unit Q based on the LLM outputs generated in Operations 260, 278, 282 and other information known to the API Server 106 (e.g., "QT, Q, RRs, Answerability Information, RPs, Concept-Concern Tags, System-Concern Tags, <L2, L3, L4>"). The Question Record for each Question Unit is transformed into a format that can be imported into the Learning Management System (LMS) 112. The LMS 112 is the platform where the questions would actually be delivered to a user (e.g., an examinee) or assembled into quizzes that would be delivered to a user. The LMS 112 stores each Question Record QR (including its embedded Question Units Q) in a catalog searchable by tags and keywords (Operation 290). The searchable tags, for example, can correspond to the Concept-Concern Tags and System-Concern Tags that are included in each Question Record QR.

In at least some examples, the LMS 112 supports Moodle™ Extensible Markup Language (XML) and transforming the question record QR includes converting it into a Moodle™ XML format, as illustrated by the following notation: "API Server"→"API Server" [Generate Moodle XML from Q, RR, Refs, Concept-Concern Tags, System-Concern Tags, <L2, L3, L4> tags"]. In other examples, the exported representation of the question can be any suitable format for an external question presentation system.

An example Question Record QR (including a Question Unit Q and associated data) in Moodle™ XML format is illustrated in table 6 below:

TABLE 6

EXAMPLE QUESTION RECORD QR IN MOODLE XML

```
<question type="multichoice">
<name><text>Assessing client understanding of confidentiality</text></name>
<questiontext format="html">
<text> <! [CDATA[A nurse is caring for a client diagnosed with unstable angina. The client has
been provided with information about their condition and the importance of confidentiality
regarding their health records.< br/><br/>
<img src="//s3.amazonaws.com/nai.nurseachieve.com/arrow_bullet.png">
Which of the following actions by the nurse would <b>best</b> assess the client's understanding
of confidentiality ?<p>]]></text>
</questiontext>
<generalfeedback format="html"><text></text></generalfeedback>
<defaultgrade>1.0000000</defaultgrade>
<penalty>0.0000000</penalty>
<hidden>0</hidden>
<idnumber></idnumber>
<single>true</single>
<shuffleanswers>true</shuffleanswers>
<answernumbering>none</answernumbering>
<showstandardinstruction>1</showstandardinstruction>
<correctfeedback format="html"><p></p>Your answer is correct.< br/><br/><text> <! [CDATA[
<b>LEARNING OBJECTIVE:< /b><br/>Assess a client's understanding of confidentiality in the
context of their health care.< br/><br/>
<b>BACKGROUND:< /b><br/> Confidentiality in healthcare is critical and involves the
protection of personal health information from unauthorized access or disclosure. It is essential
for maintaining trust between clients and healthcare providers. Clients with conditions like
unstable angina might interact with various healthcare professionals, making it imperative for
```

TABLE 6-continued

EXAMPLE QUESTION RECORD QR IN MOODLE XML them to understand what confidentiality means in their care. The nurse plays a vital role in
ensuring clients understand how their health information is managed, which is pivotal in
preventing unintentional disclosure and promoting client autonomy.< br/><br/>
<b>RATIONALE:</b><br/>
<strong>Correct Answer:</strong><br/>
<em>Ask the client to explain what confidentiality means</em> - Asking the client to
explain the concept in their own words directly assesses their understanding and ensures they
grasp the importance of how their health information is handled.< br/><br/>
<strong>Incorrect Answers:</strong><br/>
<em>Assure the client that their data is safe</em> - While providing reassurance is important, it
does not assess the client's understanding of confidentiality.<br/><br/>
<em>Provide the client with a brochure on hospital privacy policies</em> - Providing additional
reading material is helpful but does not directly assess the client's current
understanding.<br/><br/>
<em>Confirm the client's details in the presence of visitors</em> - This action could breach
confidentiality and does not assess the client's understanding of the concept.< br/><br/>
<b>TAKEAWAY:< /b><br/>Effective assessment of a client's understanding of confidentiality helps
ensure that they are fully informed about the privacy of their health information, which is crucial
for building trust and compliance with treatment protocols.< br/><br/>
<b>REFERENCES:< /b><br/>
<b>[1]</b> Harding, M., Kwong, J., Hagler, D., & Reinisch, C. (2023). < i>Lewis's Medical-Sur-
gical
Nursing: Assessment and Management of Clinical Problems</i>. Elsevier, Inc.< br/><br/>
<b>[2]</b> Ignatavicius, D.D., Rebar, C.R., Heimgartner, N.M. (2024). < i>Medical-Surgical Nurs-
ing:
Concepts for Clinical Judgment and Collaborative Care</i>. Elsevier, Inc.< br/><br/>
]]></text></correctfeedback>
<partiallycorrectfeedback format="html"><text></text></partiallycorrectfeedback>
<incorrectfeedback format="html"><p></p>Your answer is
incorrect.< br/><br/><text> <! [CDATA[
<b>LEARNING OBJECTIVE:< /b><br/>Assess a client's understanding of confidentiality in the
context of their health care.< br/><br/>
<b>BACKGROUND:< /b><br/> Confidentiality in healthcare is critical and involves the
protection of personal health information from unauthorized access or disclosure. It is essential
for maintaining trust between clients and healthcare providers. Clients with conditions like
unstable angina might interact with various healthcare professionals, making it imperative for
them to understand what confidentiality means in their care. The nurse plays a vital role in
ensuring clients understand how their health information is managed, which is pivotal in
preventing unintentional disclosure and promoting client autonomy.< br/><br/>
<b>RATIONALE:</b><br/>
<strong>Correct Answer:< /strong><br/>
<em>Ask the client to explain what confidentiality means</em> - Asking the client to
explain the concept in their own words directly assesses their understanding and ensures they
grasp the importance of how their health information is handled.< br/><br/>
<strong>Incorrect Answers:< /strong><br/>
<em>Assure the client that their data is safe</em> - While providing reassurance is important, it
does not assess the client's understanding of confidentiality.< br/><br/>
<em>Provide the client with a brochure on hospital privacy policies</em> - Providing additional
reading material is helpful but does not directly assess the client's current
understanding.<br/><br/>
<em>Confirm the client's details in the presence of visitors</em> - This action could breach
confidentiality and does not assess the client's understanding of the concept.< br/><br/>
<b>TAKEAWAY:</b><br/>Effective assessment of a client's understanding of confidentiality helps
ensure that they are fully informed about the privacy of their health information, which is crucial
for building trust and compliance with treatment protocols.< br/><br/>
<b>REFERENCES:</b><br/>
<b>[1]</b> Harding, M., Kwong, J., Hagler, D., & Reinisch, C. (2023). < i>Lewis's Medical-Sur-
gical
Nursing: Assessment and Management of Clinical Problems</i>. Elsevier, Inc.< br/><br/>
<b>[2]</b> Ignatavicius, D.D., Rebar, C.R., Heimgartner, N.M. (2024). < i>Medical-Surgical Nurs-
ing:
Concepts for Clinical Judgment and Collaborative Care</i>. Elsevier, Inc.< br/><br/>
]]></text></incorrectfeedback>
<shownumcorrect/><answer fraction="100" format="html"><text> <! [CDATA[Ask the client to
explain what confidentiality means]]></text><feedback
format="html"><text></text></feedback></answer>
<answer fraction="0" format="html"><text> <! [CDATA[Assure the client that their data is
safe]]></text><feedback format="html"><text></text></feedback></answer>
<answer fraction="0" format="html"><text> <! [CDATA[Provide the client with a brochure on
hospital privacy policies]]></text><feedback format="html"><text></text></feedback></answer>
<answer fraction="0" format="html"><text> <! [CDATA[Confirm the client's details in the pres-
ence
of visitors]]></text><feedback format="html"><text></text></feedback></answer>
<tags>
<tag><text> <! [CDATA[C_Education]]></text></tag>
<tag><text> <! [CDATA[S_Management of Care]]></text></tag>
<tag><text> <! [CDATA[S_Cardiovascular]]></text></tag>
<tag><text> <! [CDATA[C_Angina]]></text></tag>

TABLE 6-continued

EXAMPLE QUESTION RECORD QR IN MOODLE XML

```
<tag><text> <! [CDATA[N_Client Education]]></text></tag>
<tag><text> <! [CDATA[C_Confidentiality]]></text></tag>
<tag><text> <! [CDATA[adpq_1]]></text></tag>
<tag><text> <! [CDATA[L3_MC_Confidentiality/information security]]></text></tag>
<tag><text> <! [CDATA[N_Ethics]]></text></tag>
<tag><text> <! [CDATA[S_Community Health]]></text></tag>
<tag><text> <! [CDATA[L4_MC_Confidentiality/information security_Assess staff member and
client understanding of confidentiality requirements]]></text></tag>
<tag><text> <! [CDATA[Bloom_Application]]></text></tag>
<tag><text> <! [CDATA[QT_Multiple Choice: 0/1 scoring (NGN)]]></text></tag>
</tags>
</question>
```

Then API Server 106 is also configured to provide each Question Record QR to AQG DB 108 for storage (Operation 292). Each Question Record QR can be linked in AQG DB 108 to the proposed scenarios stored in Operation 218 and the earlier versions of the Question Units Q stored in Operation 264. In this regard, API Server 106 provides both the latest version of the LLM JSON responses generated in respect of the Question Unit Q, together with the LMS formatted version of the Question Unit Q (e.g., the Moodle™ XML version), as illustrated by the notation: "API Server"→"DB" ["LLM JSON response, Moodle XML"]. At the completion of the Question Scenario Generation Stage 200, Question Generation Stage 250, and Tagging and Answerability Stage 270 described above, the LMS 112 is provided with a cataloged set of examination Question Units Q that can then be selected to provide an on-line examination.

With reference to FIG. 2E, in at least some example embodiments, a Final Question Review Stage 293 is performed. Final Question Review Stage 293 enables a user of user device 102 to review Question Units Q in the same format as those Question Units will be presented by LMS 113 to examinees. FIG. 2E illustrates a set of operations that is performed for each Question Unit Q. At Operation 294, Web Server 104 provides a Question Unit review interface that can be accessed through a web browser of user device 102. In Operations 294 and 296, Web Server 104 interacts with LMS 112 to cause LMS 112 to provide a Question Unit Q for user review. In one example, the Question Unit review interface provides an HTML iframe display that enables the Question Unit Q provided by the LMS 112 question catalogue to be reviewed on a display screen of the user device 102. This enables a user to see the Question Unit Q in the format that is used by the LMS 112 (for example, Moodle XML). The Web Server 104 enables user device 102 to provide a user interface display through which a user can review, edit, provide feedback and/or approve, or approve and request a variant with respect to the content of the Question Unit Q (Operation 297), and provide feedback to the Web Server 104 Question Unit variants can be processed in the a manner similar to that discussed above.

In one example, the feedback may be provided in the same manner as described above in respect of Operations 267B and 267C. For example, predefined user selectable phrases such as "answer choices are too obvious", "more than one possible right answer", and the like can be provided. In another example, the user may also highlight a specific portion or portions of text to indicate specific text that the user selected feedback phrase applies to. In another example, the user may provide natural language feedback instead of or in addition to highlighting the portions of text to which the feedback applies.

In Operation 298, Web Server 104 determines if the user has approved the presented Question Unit or not. In the event that the user has indicated that the presented Question Unit is accepted, the review process is completed for that question.

In the case where the user has indicated that the presented Question Unit is not accepted, the Question Unit record and any user feedback (i.e., one or more of any user selected feedback phrases, user natural language feedback, and identification of highlighted Question Unit text to which the feedback applies) is provided to API server 106 which checks the edited text for the presence of improper or malicious keywords, and if it determines such keywords are absent, the API Server 106 generates one or more LLM prompts (Operation 299A) based on the user feedback. In one example, the prompts includes a first prompt that includes instructions for LLM 114 to confirm that the user feedback is valid feedback and that the feedback does not contain improper or malicious instructions that could cause the LLM to produce anything other than an intended result. This first prompt could for example be performed in a manner similar to that described above in respect of topic validation prompt performed in Operation 224. The first prompt is processed by LLM 114 (Operation 299B), and the results returned to API Server 106 for evaluation. In the event that the API Server 106 determines that the prompt contained improper or malicious keyword or the LLM results indicate that the user feedback is faulty or malicious, an error code can be generated and returned to the Web Server 104, and the Final Question Review (Stage 293) for the subject Question Unit restarted as Operation 294.

In the case where the API Server 106 determines that the LLM results for the first prompt indicate that the user feedback is valid, then a second prompt is generated in Operation 299A to instruct the LLM 114 to regenerate the subject Question Unit Q based on the user feedback. For example, the Question Unit Q content in JSON format can be obtained from AQG DB 108 and included in the second prompt together with user feedback content and instructions for the LLM 114 to regenerate the Question Unit Q to address the user feedback. The LLM 114 processes the second prompt in Operation 299B to provide data for a revised Question Unit Q. API Server 106 receives the regenerated question from LLM 114. The API Server 106 will then transform the regenerated question to make it suitable for importation into LMS (Operation 299C) and (i) provide the updated JSON and Moodle™ version of the regenerated question to LMS 112 to update the question record data in the LMS 112 (Operation 299E) and (ii)

provide the updated JSON and Moodle™ version of the regenerated question to AQG DB 108 to update the question record data stored at the AQG DB 108 (Operation 299D).

Operation 294 and onwards can then be repeated in respect of the regenerated question until user approval is obtained for the question or a predetermined terminal condition is reached.

The above-described systems and methods illustrate a process for generating Question Units that each include a "single-question" format, meaning that each Question Unit or Question Unit Variant includes a single independent question.

Case Study Question Generation Implementation

In example implementations, AQG system 100 is also (or alternatively) configured to generate "Case-Study" format questions in which multiple Question Units are generated at a time based on the same case study scenario. In a case study example, subsequent questions can depend on the answers provided to previous questions within the case study.

The process for generating "Case-Study" Question Units will now be described with reference to FIGS. 4A, 4B, 5A and 5B.

Figure 4A:
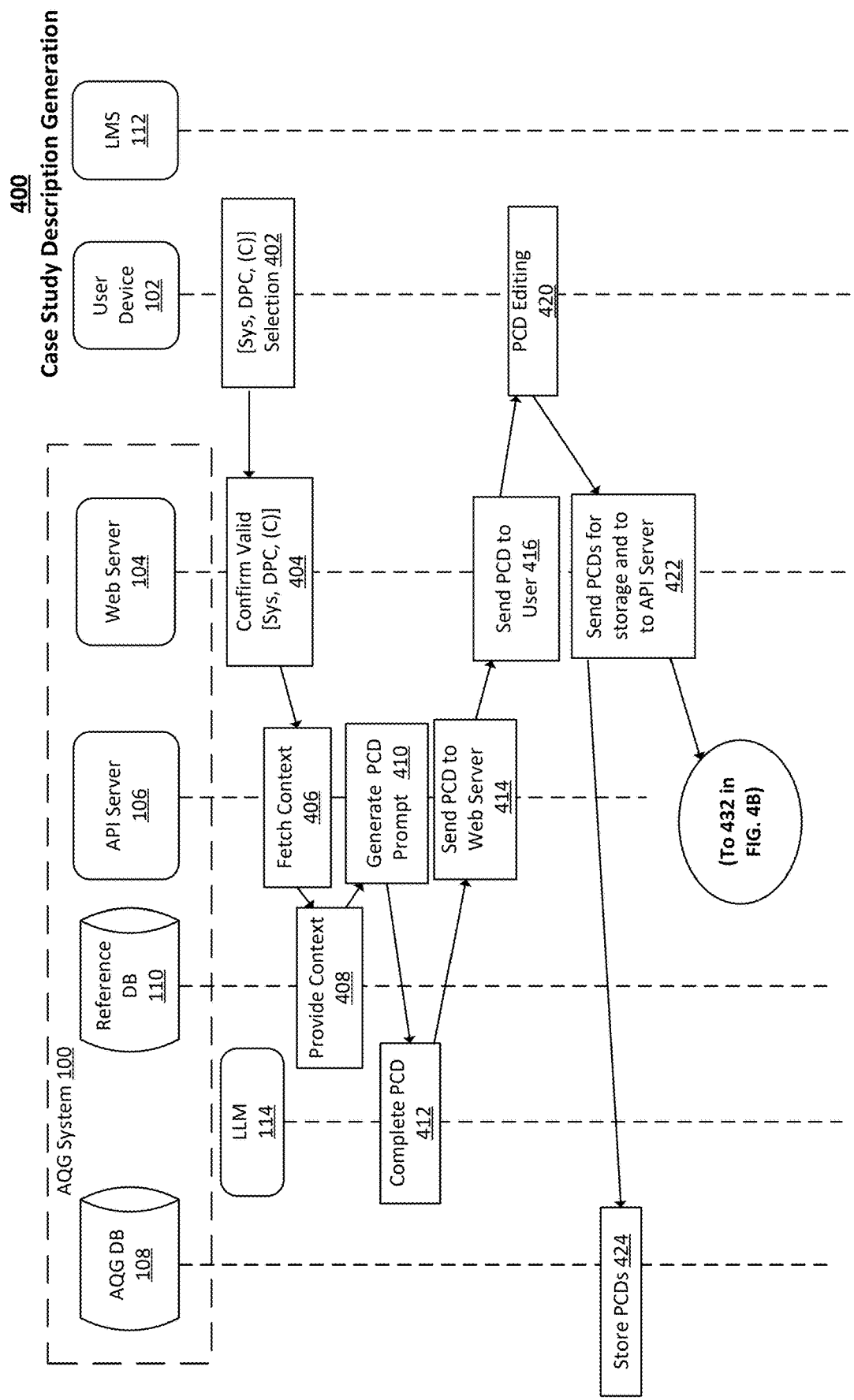
FIGS. 4A and 4B are block diagrams illustrating operations performed by, and signaling between, various components of the environment of FIG. 1 to generate a case study, with FIG. 4A showing a First Stage and FIG. 4B showing a Second Stage.

FIG. 4A illustrate a first set of operations 400 performed by, and signaling between, various components of environment 90 to generate a Patient Case Scenario, referred to herein as a "Patient Case Description" (PCD), using AQG system 100. The PCD can then be used for multiple Question Units. A Patient Case Description is a set of parameters that can, for example, include the following categories of values: "System", "Disease, Condition or Procedure", "Complication" (Optional), "Age", "Setting", and "Scenario Description". In an illustrative example, a Patient Case Description can be denoted as PCD=[System, DCP, (C), A, S, SD], where parentheses ( ) indicate that C is an optional parameter.

In an initial Operation 402, a user is prompted to input a minimum set of parameters for a Patient Case Description PCD. For example, a user in prompted to provide values for the parameters [System, DCP, (C)], which can be then used in future operations to constrain additional Patient Case Description PCD parameters that are to be generated by the LLM 114.

The parameters System, DCP, and C are hierarchical in that a user can select from a pre-defined list of "Systems", each System category is itself associated with predefined lists of "Disease", "Condition" or "Procedure", and each of "Disease", "Condition" or "Procedure" are themselves associated with respective predefined lists of concerns (C).

Figure 5A:
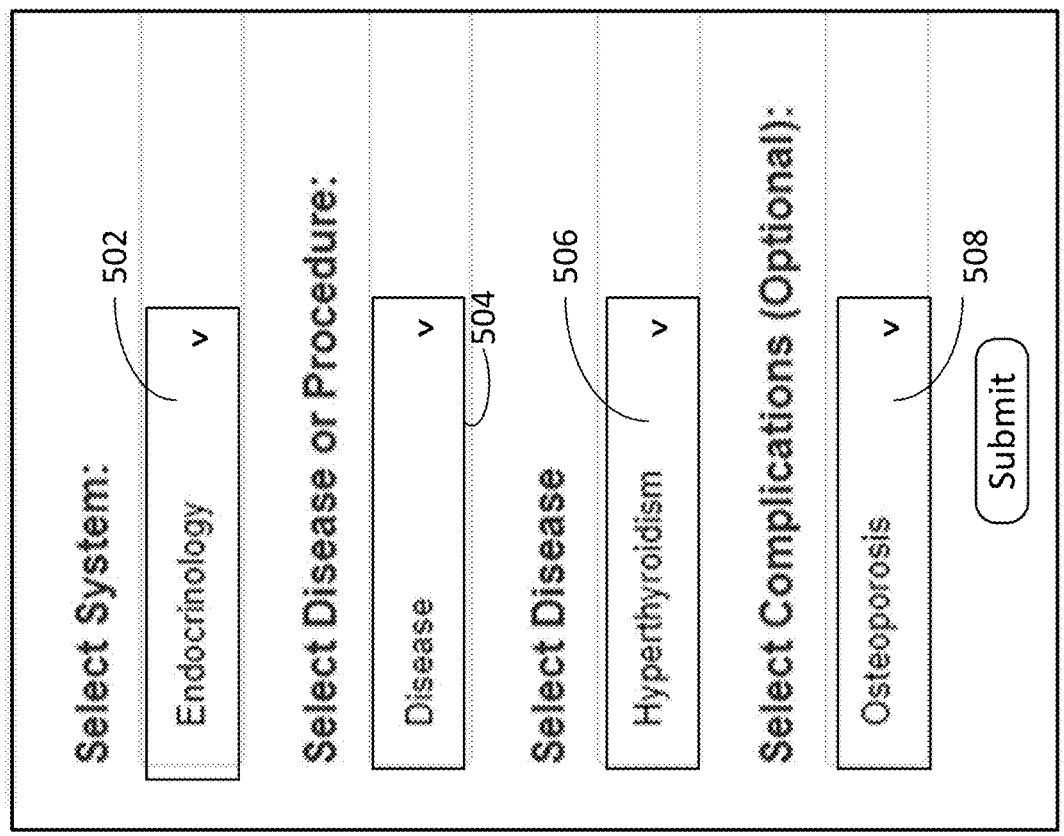
FIG. 5A illustrates an interactive user interface display for enabling a user to select variable inputs for system; disease, condition or procedure; and complication parameter categories.

With reference to FIG. 5A, in Operation 402, the user device 102 presents a user with web page based interactive user interface display 500, enabling a user to select values for the minimum set of PCD parameters [System, DPC, (C)]. As shown, user interface display 500 includes a drop down menu selection field 502 that allows the user to select from a list of predefined Systems, and a second selection field 504 that allows a user to select between either "disease", "condition" or "procedure". A further down menu selection field 506 is displayed that allows the user to select from a respective list of predefined diseases, conditions or procedures (based on the selection made in field 504) that correspond to the previously selected System. A drop-down menu selection field 508 allows the user to optionally select from a list of predefined complications C of the previously selected "disease", "condition" or "procedure".

As noted above user input of a complication C is optional. As will be explained in greater detail below, the user only supplies System and DPC (e.g., user input minimum set of PCD parameters=[System, DPC], then in a future operation, the LLM 114 will be prompted to create a Case Study Question about the DPC. However, if the user supplies System, DPC, and C (e.g., user input minimum set of PCD parameters=[System, DPC, C], then in a future operation, the LLM 114 will be prompted to create a Case Study Question about the complication C.

Referring again to FIG. 4A, at Operation 402 the user input minimum set of PCD parameters=[System, DPC, (C)] is sent to the Web Server 104. In an example implementation, Web Server 104 checks at Operation 404 to confirm that the user input minimum set of PCD parameters [System, DPC, (C)] is a valid input. For example, the user input minimum set of PCD parameters [System, DPC, (C)] can be compared against a complete list of allowable [System, DPC, (C)] combinations that is stored, for example, at Examination Criteria DB Server 116). In the event that an incomplete or unallowable combination of user input minimum set of PCD parameters has been provided, an error message is generated and Operations 402 and 404 can be repeated until an allowable user input minimum set of PCD parameters=[System, DPC, (C)] is obtained.

In the illustrated example, Web Server 104 sends the user input minimum set of PCD parameters=[System, DPC, (C)] to API Server 106. In one example, API Server 106 is configured to query (Operation 406) the Reference DB 110 about one or more of the PCD parameter values. In response to vector and/or keyword searching, Reference DB 110 returns (Operation 408) context information (CONTEXT) relating to one or more of the parameters DPC, C. This information can be used to generate case study questions in future steps to increase the chances that the questions that are generated by LLM 114 are answerable using a defined set of references. In some examples, the context gathering Operations 406 and 408 can be omitted.

At Operation 410, the API server 106 fills in a predefined prompt template to generate an LLM prompt that is configured to cause the LLM 114 fill in any missing PCD parameters that are required in addition to the user input minimum set of PCD parameters=[System, DPC, (C)]. In the illustrated example, the LLM 114 is prompted to to complete the Patient Case Description PCD by generating parameters for age A, setting S, and Scenario Description SD based on the user input minimum set of PCD parameters=[System, DPC, (C)]. In some examples, the LLM prompt instructs the LLM 114 to generate a total quantity of "N" complete PCDs based on the user input minimum set of PCD parameters=[System, DPC, (C)]. The value of N can for example be predetermined by a system administrator, or can be provided as a user input in Operation 402. An example of content that can be included in a PCD prompt template is shown below in TABLE 7.

TABLE 7

Example Prompt Template for Patient Case Description PCD Prompt

| Description of Content | Example Template Content |
|---|---|
| A perspective that the LLM is to take when performing the task | "You are an NCLEX question writer." |
| Provide Input Parameters | In the context of a patient case for an NCLEX question pertaining to the system {{system}} and the {{d_p_choice}} {{disease_procedure}} {%- if complication != "N/A" -%} , and the complication {{complication}}, {%- endif -%} |
| Expected output parameter categories | "Provide {{N}} realistic combinations of (1) setting (e.g. Hospital, Homecare, Pediatric Unit, Cardiovascular Unit, Community Clinic, etc.) (2) age_group (i.e. Pediatric or Geriatrics or Adult) in the context of a realistic patent case in an NCLEX question. (3) case_scenario, a short description of a patient case scenario that is related to the disease or condition, setting, age group and complication." |
| Expected output format and example(s) | "Give your output in JSON format. Here is an example of a JSON response structure: { "combinations": [ { "setting": "Pediatric Unit", "age_group": "Pediatric", "case_scenario": "A 10-year-old female with a history of hypertension presents with a headache and fatigue during a routine check-up. Her blood pressure is recorded at 135/85 mmHg." }. . . " |

At Operation 412, the LLM 114 processes the PCD prompt and generates N PCDs (each PCD=[System, DCP, (C), A, S, SD], where A, S, SD are unique for each PCD) as a structured JSON object, providing a high-level description of a patient case. The set of PCDs is returned to API Server 106. The API Server 106 inserts any Context information obtained any Context data obtained in Operations 406, 408 and sends (Operation 414) the set of N completed PCDs each PCD=[System, DCP, (C), A, S, SD, (Context)] to the Web Server 104. The Web Server 104 presents (Operation 416) the Proposed Scenarios PCDs via a webpage interface and user device 102 to a user.

As indicated at Operation 420, a user can interact with user device 102 to accept, reject (delete), or edit the parameter values included in each of the PCDs, subject to predefined restrictions. By way of example, FIG. 5B shows an example of an interactive interface display 510 that can be presented to a user via user device 102 that shows the values for parameters for 4 PCDs, namely proposed PCD1 to PCD4. The user can edit selected parameters for each of the PCDs by, for example, selecting a parameter that will then cause a drop-down menu of acceptable replacement parameter inputs to be displayed for user selection.

Figure 4B:
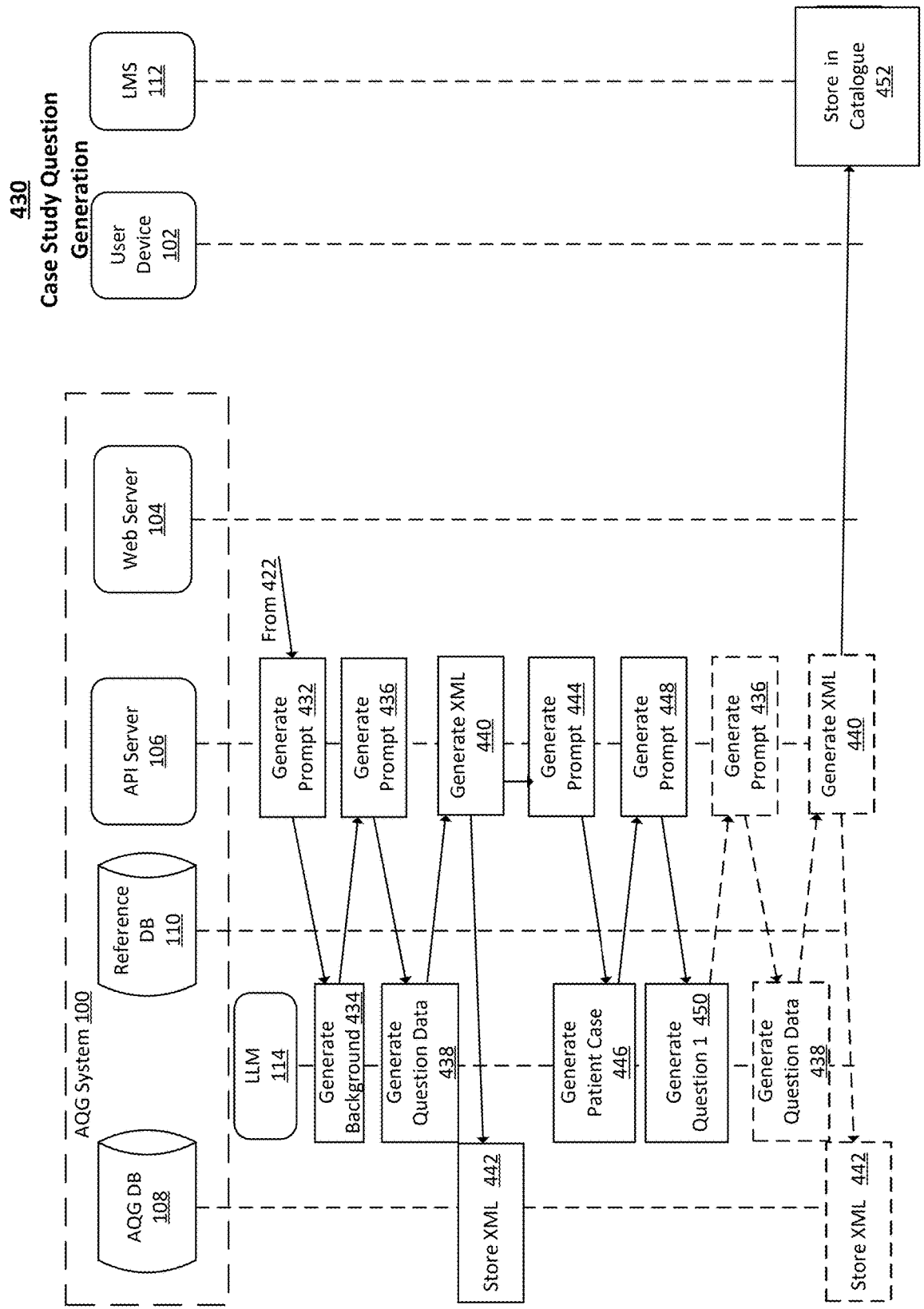

The user approved PCDs are obtained by web Server 104, which can send the user approved set of PCDs to AQG DB 108 for storage (Operation 424), and to API Server 106 for further processing (FIG. 4B, described below).

In some examples, validation checks can be performed on any user edited fields in the user approved PCDs as described above in respect of Operations 224 to 228.

At the completion of the set of operations 400 of FIG. 4A, a finalized set of user approved Patient Case Descriptions PCDs (each PCD=[System, DCP, (C), A, S, SD, (Context)], where A, S, SD are unique for each PCD and the parentheses surrounding Context are to indicate that it is an optional parameter. Processing of the Patient Case Descriptions PCDs to generate sets of questions will now be described with reference to the set of operations 430 illustrated in the flow and signaling diagram of FIG. 4B.

The set of operations 430 illustrated in the flow and signaling diagram of FIG. 4B results in a Case Study that includes a set of k questions being generated for each user approved Patient Case Description PCD. FIG. 4B will be described in the context of a single Case Study generated for a single Patient Case Description PCD.

In the illustrated example, the set of operations 430 includes an ordered series of LLM prompts to generate a total of k=six (6) questions per Patient Case Description PCD.

At Operation 432, the API Server 106 receives a Patient Case Description PCD, as represented by the notation: [System, DCP, (C), A, S, SD, (Context)]. API Server 106 inserts [System, DPC, (C)] into a predefined prompt template to generate "Prompt P1—Background", which is configured to instruct the LLM 114 to assemble background information about the specified disease, condition or procedure DPC and, if present, complication C.

The "Prompt P1—Background" includes instructions for the LLM 114 to list:

(1) The most common complications of a disease, procedure or condition DPC (or complication C of that DPC if a complication is supplied by the user).

(2) Pharmacological and non-pharmacological treatment for each DPC (or C).

(3) Any signs and symptoms for each DPC (or C).

(4) A list of possible complications if treatment is delayed for each DPC (or C).

TABLE 8 below illustrates an example of content that can be included in a prompt template for "Prompt—Background".

TABLE 8

Example Prompt Template for Prompt - Background

| Description of Content | Example Template Content |
| --- | --- |
| A perspective that the LLM is to take when performing the task | "You are an NCLEX question writer." |
| High Level Task Description, if complication C IS NOT specified | "{% if complication == "N/A" -%}<br>I will provide you with a disease or procedure, a setting, an age group, and a patient case. List 4-6 most common complications based on the patient case, a {{age_group}} patient who has {{disease}} in a {{setting}} environment.<br>The complications must be related to the disease or procedure and the patient case." |
| High Level Task Description, if complication C IS specified | "{%- else -%}<br>I will provide you with a disease or procedure, a complication of the<br>disease or procedure, a setting, an age group, and a patient case. List 4-6 most common complications of the complication the patient is experiencing based on the patient case, whom is a {{age_group}} patient in a {{setting}} environment, currently have {disease}} and experiencing {{complication}}.<br>{%- endif%}" |
| Detailed Instructions | For each complication (lets call them "Comps". The key should be the name of the complication), list the following:<br>(i) its most common causes in order from most common to least common (key = "causes")<br>(ii) its most common pharmacological treatment options (key = "pharmacological_treatment")<br>(iii) its most common non-pharmacological treatment options and nursing interventions. (key = "non_pharmacological_treatment")<br>(iv) its most common signs and symptoms. For each sign and symptom, list them from most common to least common (key = "signs_and_symptoms")<br>(v) its most common complications if treatment is delayed. (key = "complications_if_treatment_delayed"). You need to list at least 3 common complications if treatment is delayed. For each common complications if treatment is delayed, explain why it is a complication if treatment is delayed for that specific complication (Comps). |
| Expected output format and example(s) | "Respond with a JSON object containing the above information. Here is an example output format:<br>{<br>"complications": [<br>{<br>"Allergic Reaction": {<br>"causes": [<br>"Allergen in donor blood",<br>"Pre-existing allergies in the patient",<br>"Incompatible blood product"<br>],<br>"pharmacological_treatment": [<br>"Antihistamines",<br>"Corticosteroids",<br>"Epinephrine (for severe reactions)"<br>],<br>"non_pharmacological_treatment": [<br>"Stopping the transfusion immediately",<br>"Administering oxygen",<br>"Monitoring vital signs"<br>],<br>"signs_and_symptoms": [<br>"Rash",<br>"Itching",<br>"Hives",<br>"Fever",<br>"Chills"<br>],<br>"complications_if_treatment_delayed": [<br>{"Anaphylaxis":"explanation"},<br>{"Shock":"explanation"},<br>{"Death":"explanation"}<br>]<br>}<br>}, . . . " |
| Detailed JSON schema instructions | "Your response should be a valid RFC8259 compliant JSON conforming to the following JSON schema:<br>{ "$schema": "http://json-schema.org/draft-07/schema... " |

At Operation 434, the LLM 114 processes "Prompt—Background" and returns a JSON object containing the following data categories:

(1) Complications ("COMP") of DPC ("e.g., Diabetic Ketoacidosis") or complication of C ("CC").

(2) Pharmacological treatments ("PTs") and non-pharmacological treatments ("NPTs") for each complication (e.g., Insulin, IV fluids).

(3) Signs and symptoms of the complication ("SSs") (e.g., Polyuria, Polydipsia).

(4) A list of possible complications if treatment is delayed (CTD) for each DPC (or C).

At Operation 436, the API Server 106 inserts content from the Patient Case Description PCD Context information and content returned by the LLM 114 to "Prompt—Background" into a further prompt template for "Prompt—Question Data". The prompt template "Prompt—Question Data" is a multi-purpose template that includes embedded options for generating unique prompts for different categories of question types QT (e.g., QT E {highlight, sata, mc, ddr, mmc} depending on a specified question type QT. The template for Prompt—Question Data is also used as a basis for multiple subsequent LLM prompts, described below.

In Operation 436, the first use of "Prompt-Question Data" is done in the context of a "sata" question type QT, referred to herein by the notation "Q2_sata", with a purpose of acquiring information from the LLM 114 that can be used by the API Server 106 in a subsequent step to generate questions. The information that is to be obtained includes data for a Question Unit Q form the following categories: (1) Question; (2) Answer Choices (with rational: whether correct, why correct/incorrect); (3) Learning Objective; (4) Background; (5) Takeaway; and (6) References. In one example, at Operation 436, the API Server 106 inserts the values for <COMP, PTs, NPTs, SSs> into the prompt template for "Prompt P2". The resulting prompt is sent for processing by the LLM 114 (Operation 438).

Table 9 below illustrates an example of content that can be included in a prompt template for "Prompt—Question Data".

TABLE 9

Example Prompt Template for Prompt - Question Data

| Description of Content | Example Template Content |
| --- | --- |
| A perspective that the LLM is to take when performing the task | "You are an NCLEX question writer." |
| Insert specified Question Type QT into prompt. | "I will provide you with a question, Write a question feedback for a<br>{%- if type == "Q1_highlight" -%}<br>highlight question.<br>{% elif type == "Q2_sata" or type == "Q1_sata" -%}<br>select all that apply question.<br>{% elif type == "Q3_mc" -%}<br>multiple choice question.<br>{% elif type == "Q3_ddr" -%}<br>drop-down rationale/drag and drop rationale question.<br>{% elif type == "Q4_mmc" -%}<br>matrix multiple choice question.<br>{% endif %}" |
| Headings to be included in output | "Include the following headings in your response:<br>(1) Learning Objective<br>(2) Background, where you provide the context the student needs to understand the question, answer choices, condition and its interventions, and the overall question. (3) Takeaway, where you summarize the key learnings from the question in a 1 to 2 sentence;<br>(4) References, in which you select the most appropriate references from the list of referenced I will provide you." |
| Identify list of references LREFS | "The list of references you can choose from are:<br>Harding, M., Kwong, J., Hagler, D., & Reinisch, C. (2023). Lewis's Medical-Surgical Nursing: Assessment and Management of Clinical Problems. Elsevier, Inc. |
| Specific Instructions to include in Prompt, selected by API Server based on question type QT | "{% if type == "Q1_highlight" or type == "Q1_sata" -%}<br>The key "Cues for Possible Diagnosis Requiring Intervention"<br>are the correct answers, the key "Cues Not Requiring Intervention" are the distractors.<br>In the Learning Objective, Background, Takeaway sections do<br>not reveal the complication the client is experiencing.<br>{% elif type == "Q2_sata" -%}<br>In the keys "Correct Answers" and "Incorrect Answers", I will<br>provide you with cues based on observations of the client. For each cue, determine whether it requires nursing intervention for that client. If it does not require intervention,<br>explain why it falls within the normal range or is not of immediate concern. If it does require intervention, explain what the abnormal finding is, why it may be concerning, and |

TABLE 9-continued

Example Prompt Template for Prompt - Question Data

| Description of Content | Example Template Content |
|---|---|
| | what further action or monitoring might be required. Ensure the explanation is clear, concise, and based on typical medical standards.<br>Here is the patient case:<br>{patient_case}}<br>... |
| Examples of responses (selected by API Server based on Question Type QT;) | Give your response in JSON format.<br>Below is an example. Generate JSON with the same structure and order of keys.<br>{%- if type == "Q1_highlight" -%}<br>{<br>"Scenario": "The nurse is caring for a 45-year-old female client in the hospital.",<br>"Question": "Click to highlight the findings below that would require follow-up.",<br>"Summary": "The client presented with confusion and slurred speech. Vital signs recorded as blood pressure 180/110 mmHg, heart rate 88 beats/minute, respiratory rate 16 breaths/minute, and temperature 98.6 F. The client was alert but not oriented to time or place. Pupillary response was sluggish bilaterally.... ",<br>"Cues for Possible Diagnosis Requiring Intervention": [<br>{<br>"The client presented with confusion and slurred speech.": "Confusion and slurred speech are immediate red flags in a clinical setting as they can indicate neurological impairment. Immediate intervention may be necessary to prevent further deterioration."<br>{<br>"Vital signs recorded as blood pressure 180/110 mmHg": "A blood pressure reading of 180/110 mmHg is considered hypertensive crisis level. This requires immediate medical intervention to prevent potential complications such as stroke, heart attack, or other organ damage."<br>},<br>],<br>"Cues Not Requiring Intervention": [<br>{<br>"heart rate 88 beats/minute": "A heart rate of 88 beats per minute is within the normal range for adults and typically does not require intervention unless accompanied by other concerning symptoms or signs."<br>},<br>],<br>"Learning Objective": "To understand the clinical signs that indicate a potential neurological emergency requiring immediate medical intervention, focusing on the context of a client with a history of uncontrolled hypertension.",<br>"Background": "Neurological emergencies such as strokes or increased intracranial pressure require prompt identification and management to prevent lasting damage. Symptoms like confusion, slurred speech, and disorientation, along with specific vital signs such as extremely high blood pressure and sluggish pupillary responses, are critical to recognize. These signs can suggest severe conditions like stroke, which are exacerbated by underlying issues such as hypertension and diabetes. Distinguishing between normal findings and those necessitating urgent care is vital for effective nursing intervention.",<br>"Takeaway": "Identifying and responding to urgent neurological symptoms in clients, particularly those with complex health histories like uncontrolled hypertension, is crucial to prevent complications and improve health outcomes.",<br>"References": [<br>"[1] chosen reference from the given references list",<br>"[2] chosen reference from the given references list",<br>"[3] chosen reference from the given references list"<br>]<br>}<br>{% elif type == "Q2_sata" -%} |

TABLE 9-continued

Example Prompt Template for Prompt - Question Data

| Description of Content | Example Template Content |
|---|---|
| | {<br>"Question": Which of the following complications is the client at risk for? Select all that apply."<br>"Correct Answers": [ . . . " |

The information COMP, CC, PTs, NPTs, SSs, Q, acquired in response to the "Prompt—Background" and "Prompt—Question Data" prompts can be used to generate multiple types of questions (QTs). In an example implementation, Operation 440 is performed by API Server 106 during which a Python script (see for example Operation 288 described above) is applied to transform the JSON formatted LLM outputs [COMP, CC, PTs, NPTs, SSs, Q] into a set of XML files (e.g., Case Study Records) that each correspond to a different question type QT format. These QT specific XML files are stored (Operation 442) in AQG database DB 108 for use in future operations where the user can select from multiple question types (e.g., 3 to 4 possible question types) for each of the 6 questions forming a case study.

In one example, the corresponding XML files can correspond to the following possible question types QTs: (i) MMR—Matrix Multiple Response; (ii) DDC—Drop Down Cloze; (iii) SATA—Select all that apply. Operation 440 and 442 can be represented by the notations: "API Server"→"API Server" ["Transform LLM JSON outputs into XML" ]; and "API Server"→"AQG DB" ["Store LLM JSON output and XML" ].

In Operation 444, the API Server 106 generates a further prompt ("Prompt-Patient Case") to cause LLM 114 to generate a patient case PC that can then be used to generate further case study questions in subsequent operations. API Server 106 auto-populates a prompt template with values for parameters [DPC, (C), S, C, CC, A, SD]. In Operation 446, the LLM 114 processes the prompt and returns a patient case PC that can include at least three of the following parameter categories: (1) MAR (one or more Medications), (2) Nurse's Notes, (3) one of either Admission Notes or Physician's Orders, (4) Imaging Studies, (5) Medical History, (6) History and Physical, Lab Results.

Table 10 below illustrates an example of content that can be included in a prompt template for "Prompt—Patient Case".

TABLE 10

Example Prompt Template for Prompt - Patient Case

| Description of Content | Example Template Content |
|---|---|
| Insert parameter values into high level instructions | "Create a patient case in a {{setting}} setting for a {age_group}} patient who has {{disease}} in the style of the next generation NCLEX concerning a patient experiencing "{{complication}}" caused by "{{cause_of_complication}}". Include in the patient case at least 3 of the following headings: Medications, MAR, Nurse's Notes, Admission Notes, Physician's Orders, Imaging Studies, Medical History, History and Physical, Lab Results. You cannot include both Medical History and Admission Notes at the same time." |
| Insert a selected Patient Case Description (PCD = init_patient_case) | Here is a short patient case, you should use to build the patient case around:<br>{{init_patient_case}} |
| Expected output format and example(s) | "Below is an example. Generate JSON with the same structure and order of keys.<br>{<br>"Patient Case": [<br>{<br>"Medical History": {<br>"Description": "The client has a medical history significant for sickle cell anemia requiring regular blood transfusions. No known allergies or previous adverse reactions to transfusions. The client also has a history of type 2 diabetes mellitus, controlled with oral hypoglycemics."<br>}<br>},<br>{<br>"Admission Notes": {<br>"Description": "Client is a 75-year-old female brought into the emergency department from her community group by her friend. The client's friend became concerned after noting that the client seemed confused about where they were."<br>}<br>}<br>{<br>"MAR": {<br>"Medications": [<br>{<br>"Medication": "Paracetamol", |

TABLE 10-continued

Example Prompt Template for Prompt - Patient Case

| Description of Content | Example Template Content |
|---|---|
| | "Dose": "1 g",<br>"Route": "IV",<br>"Frequency": "As needed for fever"<br>{<br>"Medication": "Hydrocortisone",<br>"Dose": "100 mg",<br>"Route": "IV",<br>"Frequency": "As needed for allergic reactions"<br>}<br>]<br>}<br>},<br>{<br>"Nurse's Notes": [<br>{<br>"Time": "1015",<br>"First_Intervention": true,<br>"Details": "Client currently oriented to person but not to place and time. Client is drowsy but arousable and speaks slowly when answering questions. Upon lung assessment the client has vesicular breath sounds over lung fields and bronchial breath sounds over trachea. Muscle twitching noted in client's hands and calves. Grade 2+ force noted on palpable radial pulses, equal on both sides. Client has a history of chronic liver disease and hypertension. Client takes 10 mg of lisinopril once daily. The client reported they have 5 alcoholic drinks per week and occasionally binge drink when stressed. "<br>}<br>]<br>},<br>{<br>"Physician's Orders": [<br>{<br>"Order": "Stop transfusion at first sign of reaction. Administer Paracetamol 1 g IV for fever."<br>},<br>{<br>"Order": "If signs of allergic reaction, administer Hydrocortisone 100 mg IV."<br>},<br>{<br>"Order": "Monitor vital signs every 15 minutes for 1 hour, then every 30 minutes for the next 2 hours."<br>}<br>]<br>}<br>]<br>}<br>Your response should be a valid RFC8259 compliant JSON conforming to the following JSON schema:... " |

In Operation 448, API Server 106 populates a further prompt template to generate an LLM prompt "Prompt—Question Q1" that instructs the LLM 114 to generate a question Q1 based on the previous LLM generated outputs. In one example, API Server 106 inserts values for at least some of the following parameter categories into a predefined template: (1) MAR (e.g., one or more Medications), (2) Nurse's Notes, (3) one of either Admission Notes or Physician's Orders, (4) Imaging Studies, (5) Medical History, (6) History and Physical, Lab Results, (7) Complication, (8) Age Group, (9) Setting, (10) a Selected PCD. In Operation 450, LLM 114 processes the prompt and responds with values for the following categories: (1) "Scenario"; (2) "Summary"; (3) "Cues for Possible Diagnosis Requiring Intervention"; (4) "Cues Not Requiring Intervention"; (5) "Consistent with Experiencing condition".

Table 11 below illustrates an example of content that can be included in a prompt template for "Prompt—Question 1".

TABLE 11

Example Prompt Template for Prompt - Question 1

| Description of Content | Example Template Content |
|---|---|
| A perspective that the LLM is to take when performing the task | "You are an NCLEX question writer." |
| Specify what patient case | {% if x == "Medical History" -%} |

TABLE 11-continued

Example Prompt Template for Prompt - Question 1

| Description of Content | Example Template Content |
| --- | --- |
| categories are to be inserted as Exhibits | I will give you the Nurse's Note and Medical History of a patient case.<br>{%- elif x == "Admission Notes" -%}<br>I will give you the Nurse's Note and Admission Notes of a patient case.<br>{%- endif -%} |
| Instructions | Summarize these Exhibits into a single paragraph and list what sentences or parts of sentences in this paragraph are the most important cues for a possible diagnosis that would require an intervention. Also list individually the sentences or part of sentences with cues that would not require intervention... ",<br>"List individually the exact excerpts of text in your outputted patient case that would be consistent with a patient experiencing "{{complication}}" in the summary and for each excerpt, include the categorization of system finding or assessment, (e.g. cardiovascular assessment, respiratory assessment, neurological assessment, vital signs, etc.).<br>You will use Nurse's Note, Medical History, Admission Notes, laboratory results, vital signs, clinical manifestations, physical assessment, or imaging studies to complete the categorization list. List at between 6 and 12 excerpts in the "Consistent with Experiencing condition" key, and between 3 and 5 excerpts in the<br>"Consistent with Experiencing condition" key.<br>"Also include a SCENARIO key in your JSON response where in 1 sentence give the case scenario." |
| Insert Parameter Values | "Here are some extra data (which may include additional exhibits such as Medications, Physician's Orders, Imaging Studies, History<br>and Physical, Lab Results). Do not consider lab values or imaging<br>studies when composing the summary but indicate for each lab value and imaging study whether it helps to diagnose "{{complication}}" or not {{data}}<br>Here is the Nurse's Note<br>{{nurse_notes}}<br>{% if x == "Medical History" -%}<br>Here is the Medical History<br>{%- elif x == "Admission Notes" -%}<br>Here is the Admission Notes<br>{%- endif %}<br>{note_text}}<br>Here is a short patient case you should use to build the question around:<br>{{initial_patient_case}}<br>Pediatric - 0 to 18 years (age MUST be included in scenario)<br>Geriatric - 65 and over" (age MUST be included in scenario)<br>Adult - 19 to 64 years" |
| Provide expected output format and example(s) | Below is an example. Generate JSON with the same structure and<br>order of keys.<br>{<br>"Scenario": "The nurse is caring for a 63-year-old male client in the emergency department.",<br>"Summary": "The client, a 63-year-old male, was admitted to the hospital following complaints of sudden onset of severe headache, confusion.... ",<br>"Cues for Possible Diagnosis Requiring Intervention": [<br>{"sudden onset of severe headache": "explanation"},<br>],<br>"Cues Not Requiring Intervention": [<br>{"pulse 88 beats/minute": "explanation"},<br>"Consistent with Experiencing condition": [<br>{<br>"Excerpt": "squeezing sensation in the chest",<br>"Bool": true,<br>"Type": "clinical manifestations"<br>] . . . }" |

In example embodiments, Question Review and Enhancement operations (e.g., Operations 266 and 267 of the previously described Question Review and Enhancement Stage 265) can be performed after Operation 450 to ensure overall quality of the question. These Question Review and Enhancement operations can be repeated multiple times for each question with or without user requested remediations.

In example embodiments Operations 436 to 442 are repeated multiple times using the "Prompt—Question Data" to ensure question data is generated for each of the possible Question Types QT that are specified in the template. Further prompts can also be used to generate other types of case study questions.

At the completion of the set of operations the entire set of XML case study style question records are stored at LMS 112. In some examples, user input to review and correct XML case study style question records are supported by a set of operations similar to Operations 294 to 299 of FIG. 2E.

In summary, an automated examination question generation system is described that leverages large language models (LLMs) like GPT-4o to enhance the efficiency of creating exam questions. The system addresses various challenges inherent in LLM-based question generation, such as overfitting, accuracy, ambiguity, and question diversity. The proposed method includes generating patient case scenarios for examinations (e.g., nursing certification exams) and generating multiple-choice, case study, and select-all-that-apply questions.

The system's features include:

System Architecture: It comprises various interconnected components such as user devices, a learning management system (LMS), a large language model (LLM), an API server, and databases that store the question and reference materials.

Process Overview: It includes stages such as scenario generation, question generation, tagging, and answerability checks. The system ensures questions meet examination requirements and improve learning objectives, covering diverse scenarios and complexity levels.

Question Types and Parameters: The LLM generates questions with various types and cognitive levels (e.g., multiple choice, fill-in-the-blank, matrix multiple choice). It ensures the questions match the complexity required for certification exams and are answerable based on the references provided.

Efficiency and Depth: The system mitigates repetitive question generation by allowing educators to edit, refine, and select the most suitable questions based on various parameters (e.g., age group, setting, scenario type, client need areas) and pre-specifying to the LLM that it must generate N different scenarios.

Improvement of Question Generation: The system handles the alignment of generated questions with pedagogical intent, ensuring they are not only accurate and relevant but also diverse and challenging, particularly in creating higher-order thinking questions.

Extensibility: The system is applicable to any examination, including professional certification exams like the NCLEX®.

This system represents a sophisticated solution to streamline and optimize the process of automated exam question generation. In some examples, efficient human oversight is enabled, balancing the strengths of LLMs with human oversight for improved examination quality.

Figure 6:
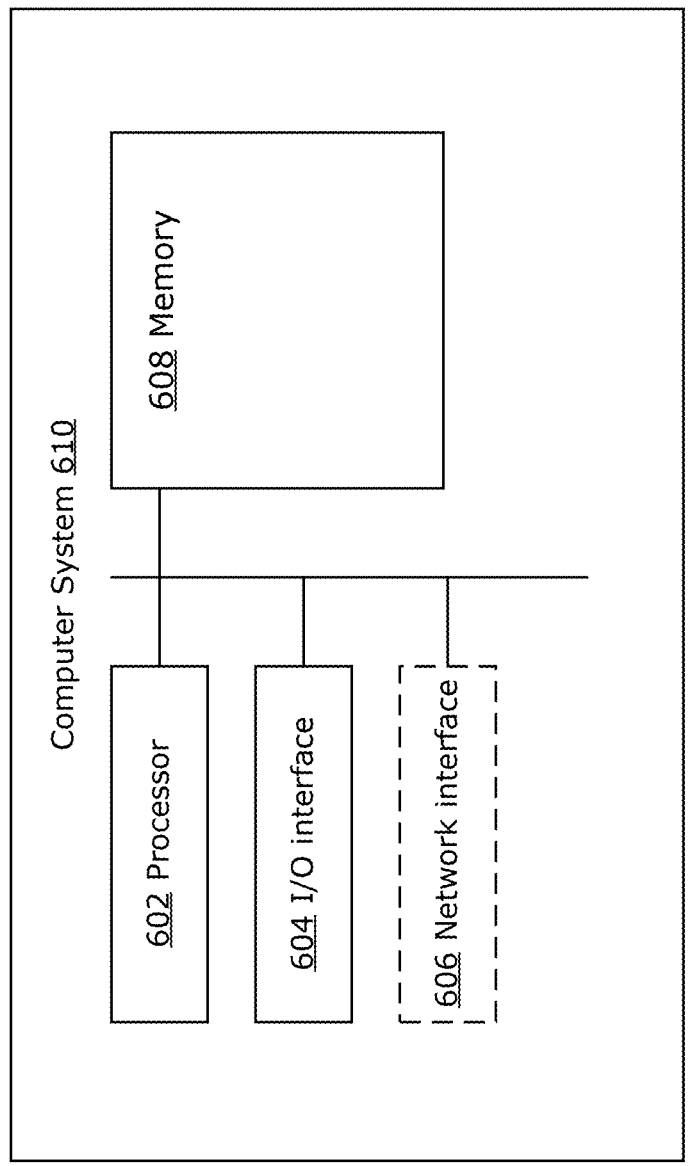
FIG. 6 is a block diagram of a computer system that can be configured to implement aspects of the disclosed methods and systems.

FIG. 6 illustrates an example of a computer system 610 that can be used to implement the one or more of the computer implemented components of the present disclosure. Computer system 610 includes one or more processors 602, such as a central processing unit, a general processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 602 may collectively be referred to as a "processor device". The computer system 610 also includes one or more input/output (I/O) interfaces 604, which interfaces with input devices (e.g., microphone) and output devices (e.g., speaker, display).

The computer system 610 can include one or more network interfaces 606 that may, for example, enable the computer system 610 to communicate with one or more further devices through a communications network such as a local area wireless network.

The computer system 610 includes one or more memories 608, which may include a volatile or non-volatile memory (e.g., a flash memory, a random access memory (RAM), and/or a read-only memory (ROM)). The non-transitory memory(ies) 608 may store instructions for execution by the processor(s) 602, such as to carry out examples described in the present disclosure. The memory(ies) 608 may include other software instructions, such as for implementing an operating system and other applications/functions. In the illustrated example, the memory 608 includes specialized software instructions for implementing one or more of the functions described above.

In some examples, the computer system 610 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the computer system 610) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the computer system 610 may communicate with each other via a bus, for example.

In at least some examples, LLM 114 can include multiple LLM models, and different prompts may be directed to different models that are optimized for the specific type of prompt being generated. Furthermore, in some examples, LLM 114 can alternatively be replaced or augmented with one or more different types of artificial intelligence (AI) based natural language processing (NLP) models.

From the above description, it will be appreciated that according to an example aspect, AQG system 100 comprises one or more processors and one or more memories storing machine-executable instructions thereon which, when executed by the one or more processors, cause the AQG system 100 to generate one or more examination questions. In one example, the AQG system 100 is caused to: (i) generate a first AI model prompt, including inserting a first set of one or more parameters into a first AI model prompt template, the first AI model prompt including instructions to provide a second set of one or more parameters pertaining to a question scenario based on the first set of one or more parameters; (ii) receive, a first prompt response for the first AI model prompt, the first prompt response including the second set of one or more parameters pertaining to the question scenario;(iii) generate a second AI model prompt, including inserting the second set of one or more parameters pertaining to the question scenario into a second AI model prompt template, the second AI model prompt including instructions to provide structured question unit content based on the second set of one or more parameters; and (iv) receive a second prompt response for the second AI model prompt, the second prompt response including the structured question unit content. The AQG system 100 can prepare a finalized question record in a specified computer readable format based on the structured question unit content and storing the finalized question record in a non-transitory memory of the one or more memories.

In some examples, the structured question unit content includes: a question related to the question scenario; a set of answer choices; for each answer choice, an indication of whether the answer choice is correct or incorrect and an explanation of why the answer choice is correct or incorrect; and identification of at least one reference that supports the set of answer choices.

In some examples, the first AI model prompt includes instructions for the AI model to provide, based on the first set of one or more parameters multiple unique versions of the second set of one or more parameters. Each of the unique versions has a unique set of values for the one or more parameters thereof and pertain to a respective unique question scenario. The first prompt response includes the multiple unique versions of the second set of one or more parameters. The AQG system 100 is caused to: (i) generate a respective version of the second AI model prompt for each unique version of the second set of one or more parameters; (ii) receive a respective second prompt response for each respective version of the second AI model prompt, each including a respective structured question unit; and (iii) prepare a respective finalized question record for each respective structured question unit storing the respective finalized question record in a non-transitory memory.

In some examples, the AQG system 100 is caused to, after receiving the first prompt response and prior to generating the second prompt response: (i) enable a user device to display the second set of one or more parameters; (ii) receive user inputs provided via the user device that edit one or more of parameters of the second set of one or more parameters; and (iii) update the second set of one or more parameters based on the user inputs.

In some examples, when text of a predefined parameter has been edited by user inputs, the AQG system 100 is caused to: (i) generate a further AI model prompt that includes instructions for verifying that the edited text conforms to allowable content; (ii) receive a response for the further AI model prompt; and (iii) when the response for the further AI model prompt indicates that the edited text does not conform to allowable content, generate an error code.

In some examples the first set of one or more parameters and the second set of one or more parameters each include multiple parameter categories, and at least some of the parameter categories are hierarchical. The AQG system 100 is caused to, prior to generating the first AI model prompt: (i) receive a user input selecting the first parameter category from the multiple parameter categories; and (ii) determine at least one or more remaining parameter categories for the first set of one or more parameters based on: (a) the selected first parameter category; and (b) a predefined set of examination criteria.

In some examples, the AQG system 100 is caused to, after receiving the second prompt response and prior to preparing the finalized question record generate a third AI model prompt including instructions for an AI model to verify that a question included in the structured question unit content is answerable based on a set of one or more predefined references.

In some examples, the AQG system 100 is caused to, after receiving the second prompt response for the second AI model prompt: (i) generate a third AI model prompt, including inserting at least some of the structured question unit content into a third AI model prompt template, the third AI model prompt including instructions for the AI model to review the at least some structured question unit content to ensure it meets a specified criteria and refine the at least some structured question unit content if required to meet the specified criteria, and (ii) receive a third prompt response for the third AI model prompt, the third second prompt response including any refinements made by the AI model in respect of the at least some structured question unit content. In at least some example embodiments, the AQG system 100 may be used to apply only some of the operations described above to process examination questions that have been previously generated using the AQG system 100, examination questions that have been generated by a different question generation system, and/or manually generated examination questions.

For example, in one example implementation, the AQG system 100 can be configured to: (i) obtain structured question unit content corresponding to a previously generated examination question; (ii) obtain feedback, input via a user device 102 for the structured question unit content; (iii) generate an LLM prompt that includes instructions to regenerate some or all of the structured question unit content based on the feedback; (iv) receive a response for the LLM prompt, the response including regenerated structured question unit content; and prepare a finalized question record in a specified computer readable format based on the regenerated structured question unit content and storing the finalized question record in a non-transitory memory.

In some examples, the feedback comprises an indication of a deficiency in the question unit content, and the generated LLM prompt includes instructions to remedy the indicated deficiency. In some examples, obtaining the feedback comprises causing the user device to present a plurality of user selectable options that each indicate a respective deficiency, and the indication of the deficiency includes an indication of one or more user selected options from the plurality of user selectable options.

In some examples, the indication of the deficiency includes a natural language input via the user device, and the AQG system 100 is configured to: prior to generating the LLM prompt perform a verification procedure that includes: generating a verification LLM prompt that includes instructions for verifying that natural language input conforms to allowable content; receiving a response for the verification LLM prompt; and when the response for the verification LLM prompt indicates that the natural language input do not conform to allowable content, generating an indication that the natural language input is nonallowable. In some examples, prior to performing the verification procedure, an initial verification check is performed of the natural language input by comparing the natural language input to a set of one or more prohibited words or phrases, and when the initial verification check indicates that the natural language input includes any of the one or more prohibited words or phrases, generating the indication that the natural language input is nonallowable.

In some examples, the indication of the deficiency includes a natural language input via the user device and an indication of specific text with the question unit content that is the subject of the natural language input.

In some further examples, the feedback includes an indication that a variant be generated in respect of the question unit content and the LLM prompt is generated to include instructions to regenerate some or all of the structured question unit content to provide the variant of the question unit content.

In some examples, obtaining the structured question unit content comprises obtaining a previously stored question record that includes the structured question unit content in the specified computer readable format, and obtaining the feedback for the structured question unit content includes providing the structured question unit content for display on the user device and receiving, from the user device, information indicating the feedback.

In a further example implementation, the AQG system 100 can be configured to generate an LLM prompt, including inserting previously generated question unit content into an LLM prompt template. The LLM prompt includes instructions for an LLM to review the previously generated structured question unit content to ensure it meets a specified criteria and refine the at least some structured question unit content if required to meet the specified criteria. A response for the LLM prompt includes any refinements made by the LLM in respect of the at least some structured question unit content. A finalized question record is prepared in a specified computer readable format based on the response and stored in a non-transitory memory.

In at least some examples, the specified criteria is specified in natural language and includes criteria indicating that the question unit content meets one or more of the following requirements: (i) includes a correct answer choice that is accurate; (ii) includes one or more incorrect answer choices that are require critical thinking to identify as incorrect answer choices; and (iii) includes question text that does not reveal the correct answer choice.

In a further example implementation, the AQG system 100 generates an LLM prompt including instructions for an LLM to provide a further version of a first examination question based on previously generated question unit content. A response for the LLM prompt is received that includes revised structured question unit content including changes to one or more of the introductory text, question stem and the set of answer choices. A finalized question record is prepared that includes a second version of the first examination question based on the revised structured question unit content. The finalized question record is stored in a specified computer readable format in a non-transitory memory, wherein the finalized question record includes information that indicates that the second version of the first examination question is an alternative version of the first examination question Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, SSDs, NVMe or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The terms "substantially" and "approximately" as used in this disclosure can mean that the recited characteristic, parameter, or value need not be achieved exactly, but that deviations or variations including for example, tolerances, measurement error measurement accuracy limitations and other factors known to those skilled in the art, may occur in amounts that do not preclude the effect the characteristic was intended to provide. By way of illustration, in some examples, the terms "substantially" and "approximately", can mean a range of within 5% of the stated characteristic.

As used herein, statements that a second item is "based on" a first item can mean that properties of the second item are affected or determined at least in part by properties of the first item. The first item can be considered an input to an operation or calculation, or a series of operations or calculations that produces the second item as an output that is not independent from the first item.

The contents of all published documents identified in this disclosure are incorporated herein by reference.

The invention claimed is:

1. A computer-implemented method for interacting with a large language model (LLM) for automated generation of examination questions for a defined examination type, comprising:
   a. obtaining, by one or more processors, a base set of scenario parameters including at least a first parameter value and a second parameter value, wherein obtaining the base set of scenario parameters comprises:
   causing, by the one or more processors, a user interface to be presented by a user device that comprises: (i) a first input control that enables user selection of the first parameter value from a first hierarchy level set of parameter value options that each pertain to allowable options for the defined examination type; (ii) a second input control that enables user selection of the second parameter value from a second hierarchy level set of parameter value options that each pertain to allowable options for the defined examination type, wherein content of the second hierarchy level set of parameter value options that are available for user selection using the second input control are determined based on the first parameter value selected using the first input control;

b. generating, by the one or more processors, a first large language model (LLM) prompt instructing the LLM to output a plurality of sets of scenario constraining parameters that each pertain to a respective question scenario, generating the first LLM prompt including inserting the base set of scenario parameters into a first structured LLM prompt template that specifies:
   (i) a natural language description of each of the base set of scenario parameters;
   (ii) a number of the sets of scenario constraining parameters to be generated;
   (iii) types of scenario constraining parameter categories to include in each set of scenario constraining parameters, a hierarchical order of the scenario constraining parameter categories and a list of allowable scenario constraining parameter values for at least some of the scenario constraining parameter categories reflecting hierarchical dependencies;
   (iv) a natural language description of one or more question types that the sets of scenario constraining parameters are to be generated in respect of; and
   (v) a computer readable format and an output format example to use for the sets of scenario constraining parameters;

c. prompting, by the one or more processors, the LLM using the first LLM prompt;

d. receiving, by the one or more processors, a first prompt response from the LLM for the first LLM prompt, the first prompt response including a plurality of generated sets of scenario constraining parameters;

e. parsing, by the one or more processors, the first prompt response to extract the plurality of generated sets of scenario constraining parameters;

f. generating, by the one or more processors, a plurality of second LLM prompts that each pertain to a respective one of the generated sets of scenario constraining parameters, each second LLM prompt instructing the LLM to output a respective structured question unit for the generated set of scenario constraining parameters that the LLM prompt pertains to, wherein generating the second LLM prompt pertaining to a respective generated set of scenario constraining parameters includes selecting, based on a question type specified for the respective generated set of scenario constraining parameters, a second structured LLM prompt template from a stored set of predefined second structured LLM prompt templates and inserting the generated set of scenario constraining parameters into the selected second structured LLM prompt template, wherein the selected second structured LLM prompt specifies:
   (i) the specified question type;
   (ii) computer readable formatting keys to include in the respective structured question unit;
   (iii) an example of a question unit format to use for the respective structured question unit, and an indication of a computer readable format to use for the respective structured question unit;

g. prompting, by the one or more processors, the LLM using the plurality of second LLM prompts;

h. receiving, by the one or more processors, a respective second prompt response for each of the plurality of second LLM prompts; and i. preparing, by the one or more processors, a respective question record in a specified computer readable question record format for each respective second prompt response based on the structured question unit included in the second prompt response and storing the respective question records in a non-transitory memory.

2. The method of claim 1 wherein the structured question unit includes: a question related to the question scenario; a set of answer choices; for each answer choice, an indication of whether the answer choice is correct or incorrect and an explanation of why the answer choice is correct or incorrect; and identification of at least one reference that supports the set of answer choices.

3. The method of claim 1 further comprising, after receiving the first prompt response and prior to generating the second prompt response:
   enabling, by the one or more processors, the user device to display the plurality of generated sets of scenario constraining parameters;
   receiving, by the one or more processors, user input provided via the user device that provide user edits of one or more parameters of the plurality of generated sets of scenario constraining parameters; and
   updating, by the one or more processors, the one or more of the generated sets of scenario constraining parameters based on the user input.

4. The method of claim 3 further comprising, by the one or more processors:
   performing a verification procedure for at least one generated set of scenario constraining parameters that has been updated based on the user input, the verification procedure comprising:
     generating a further LLM prompt that includes instructions for verifying that the user edits to one or more of parameters of a free form field of the at least one generated set of scenario constraining parameters conform to allowable content;
     receiving a response for the further LLM prompt; and
     when the response for the further LLM prompt indicates that the user edits do not conform to allowable content, generating an indication that the user edits are nonallowable.

5. The method of claim 4 comprising:
   prior to performing the verification procedure, performing, by the one or more processors, an initial verification check of the user edits by comparing the user edits to a set of one or more prohibited words or phrases, and when the initial verification check indicates that the user edits include any of the one or more prohibited words or phrases, generating the indication that the user edits are nonallowable without performing the verification procedure.

6. The method of claim 3, comprising, prior to causing the user interface to be presented to a user that comprises the first input control:
   enabling, by the one or more processors, the user device to present an interactive user interface that enables a user input to select an initial parameter category value;
   receiving, by the one or more processors, a user input selecting the initial parameter category value;
   filtering, by the one or more processors, a predefined set of examination criteria based on the selected initial parameter category value to determine allowable parameter options for inclusion in the first hierarchy level set of parameter value options and the second hierarchy level set of parameter value options.

7. The method of claim 6 wherein the initial parameter category value specifies a type of question that can be selected from a list of candidate question types.

8. The method of claim 1 further comprising, after receiving the second prompt responses and prior to preparing the respective question records:
generating, by the one or more processors, for each of the structured question units, a respective third LLM prompt including instructions for the LLM to verify that a question included in the respective structured question unit content is answerable based on a set of one or more predefined references that have been inserted into the respective third LLM prompt based on content of the structured question unit that the respective third LLM prompt is generated in respect of.

9. The method of claim 8 further comprising fetching, by the one or more processors, context data for each respective third LLM prompt, using a search vector or keyword search of a database, the fetching being based on keywords or vectors derived from the structured question unit that the respective third LLM prompt is generated in respect of, wherein the one or more predefined references are specified in the context data.

10. The method of claim 1 wherein preparing the respective question record for each respective second prompt response comprises assembling data derived from the base set of scenario parameters, the generated set of scenario constraining parameters inserted into the respective second prompt response and the structured question unit included in the respective second prompt response into the question record, the method further comprising transforming each respective question record into a further specified computer readable format and sending the transformed respective question records over a network to a Learning Management System (LMS).

11. The method of claim 1 further comprising:
generating, by the one or more processors, a plurality of third LLM prompts that each pertain to a respective one of the respective structured question units, generating a third LLM prompt including inserting at least some content of the structured question unit that the third LLM prompt pertains to into a third LLM prompt template, the third LLM prompt including instructions for the LLM to review the inserted question unit content to ensure it meets a specified criteria and refine the inserted question unit content if required to meet the specified criteria, and
receiving, by the one or more processors, third prompt responses for the plurality of third LLM prompts, the third prompt responses including any refinements made by the LLM in respect of the inserted content from the respective structured question units.

12. The method of claim 11 wherein the specified criteria is specified in natural language and includes criteria indicating that the content of the question unit meets one or more of the following requirements: (i) includes a correct answer choice that is accurate; (ii) includes one or more incorrect answer choices that require critical thinking to identify as incorrect answer choices; and (iii) includes question text that does not reveal the correct answer choice.

13. The method of claim 1, further comprising:
receiving, by the one or more processors, user input provided through a user device that indicates user feedback for one or more of the structured question units;
generating, for each structured question unit receiving user feedback, a further LLM prompt that includes instructions for regenerating the structured question unit based on the user feedback; and receiving a response for the further LLM prompt.

14. The method of claim 1 further comprising
generating, by the one or more processors, a further LLM prompt that includes instructions for generating a variant of at least one of the structured question units;
receiving, by the one or more processors, a response for the further LLM prompt that includes the variant of the at least one structured question unit;
preparing, by the one or more processors, a variant question record for the variant of the at least one structured question unit, wherein the variant question record is identifiably linked by a computer readable tag to the question record for the at least one structured question unit.

15. A computer system comprising one or more processors and one or more memories storing machine-executable instructions thereon which, when executed by the one or more processors, cause the computer system to perform a set of processing operations for interacting with a large language model (LLM) to generate one or more examination questions for a defined examination type, the processing operations including:
a. obtaining, by one or more processors, a base set of scenario parameters including at least a first parameter value and a second parameter value, wherein obtaining the base set of scenario parameters comprises:
causing, by the one or more processors, a user interface to be presented by a user device that comprises: (i) a first input control that enables user selection of the first parameter value from a first hierarchy level set of parameter value options that each pertain to allowable options for the defined examination type; (ii) a second input control that enables user selection of the second parameter value from a second hierarchy level set of parameter value options that each pertain to allowable options for the defined examination type, wherein content of the second hierarchy level set of parameter value options that are available for user selection using the second input control are determined based on the first parameter value selected using the first input control;
b. by the one or more processors, a first large language model (LLM) prompt instructing the LLM to output a plurality of sets of scenario constraining parameters that each pertain to a respective question scenario, generating the first LLM prompt including inserting the base set of scenario parameters into a first structured LLM prompt template that specifies:
(i) a natural language description of each of the base set of scenario parameters;
(ii) a number of the sets of scenario constraining parameters to be generated;
(iii) types of scenario constraining parameter categories to include in each set of scenario constraining parameters, a hierarchical order of the scenario constraining parameter categories and a list of allowable scenario constraining parameter values for at least some of the scenario constraining parameter categories reflecting hierarchical dependencies;
(iv) a natural language description of one or more question types that the sets of scenario constraining parameters are to be generated in respect of; and
(v) a computer readable format and an output format example to use for the sets of scenario constraining parameters;

c. prompting, by the one or more processors, the LLM using the first LLM prompt;
d. receiving, by the one or more processors, a first prompt response from the LLM for the first LLM prompt, the first prompt response including a plurality of generated sets of scenario constraining parameters;
e. parsing, by the one or more processors, the first prompt response to extract the plurality of generated sets of scenario constraining parameters;
f. generating, by the one or more processors, a plurality of second LLM prompts that each pertain to a respective one of the generated sets of scenario constraining parameters, each second LLM prompt instructing the LLM to output a respective structured question unit for the generated set of scenario constraining parameters that the LLM prompt pertains to, wherein generating the second LLM prompt pertaining to a respective generated set of scenario constraining parameters includes selecting, based on a question type specified for the respective generated set of scenario constraining parameters, a second structured LLM prompt template from a stored set of predefined second structured LLM prompt templates and inserting the generated set of scenario constraining parameters into the selected second structured LLM prompt template, wherein the selected second structured LLM prompt specifies:
(i) the specified question type;
(ii) computer readable formatting keys to include in the respective structured question unit;
(iii) an example of a question unit format to use for the respective structured question unit, and an indication of a computer readable format to use for the respective structured question unit;
g. prompting, by the one or more processors, the LLM using the plurality of second LLM prompts;
h. receiving, by the one or more processors, a respective second prompt response for each of the plurality of second LLM prompts; and
i. preparing, by the one or more processors, a respective question record in a specified computer readable question record format for each respective second prompt response based on the structured question unit included in the second prompt response and storing the respective question records in a non-transitory memory.

16. The computer system of claim 15 wherein the structured question unit includes: a question related to the question scenario; a set of answer choices; for each answer choice, an indication of whether the answer choice is correct or incorrect and an explanation of why the answer choice is correct or incorrect; and identification of at least one reference that supports the set of answer choices.

17. The computer system of claim 15 wherein the processing operations include, prior to preparing the finalized question record:
receiving, by the one or more processors, user input provided through the user device that indicates user feedback for one or more of the structured question units;
generating, for each structured question unit receiving user feedback, by the one or more processors, a further LLM prompt that includes instructions to regenerate some or all of the structured question units based on the user feedback; and
receiving, by the one or more processors, a response for the further LLM prompt, the response including regenerated structured question unit,
wherein preparing the respective question record is based on the regenerated structured question unit.

18. The computer system of claim 15 wherein the processing operations include:
generating, by the one or more processors, a plurality of third LLM prompts that each pertain to a respective one of the respective structured question units, generating a third LLM prompt, including inserting at least some content of the structured question unit that the third LLM prompt pertains to into a third LLM prompt template, the third LLM prompt including instructions for the LLM to review the inserted question unit content to ensure it meets a specified criteria and refine the inserted question unit content if required to meet the specified criteria, and
receiving, by the one or more processors, a third prompt responses for the plurality of third LLM prompts, the third prompt responses including any refinements made by the LLM in respect of the inserted content from the respective structured question unit.

\* \* \* \* \*

UNITED STATES PATENT AND TRADEMARK OFFICE
CERTIFICATE OF CORRECTION

| | | |
|---|---|---|
| PATENT NO. | : 12,412,484 B1 | Page 1 of 1 |
| APPLICATION NO. | : 18/941816 | |
| DATED | : September 9, 2025 | |
| INVENTOR(S) | : Hooman Katirai et al. | |

It is certified that error appears in the above-identified patent and that said Letters Patent is hereby corrected as shown below:

In the Claims

Claim 15, Column 60, Line 44: "b. by the one or more processors, a first large language" should read -- b. generating, by the one or more processors, a first large language --

Signed and Sealed this
Sixteenth Day of December, 2025

John A. Squires
*Director of the United States Patent and Trademark Office*